US009499423B2

(12) United States Patent
Adams

(10) Patent No.: US 9,499,423 B2
(45) Date of Patent: Nov. 22, 2016

(54) ELECTROBIOCHEMICAL REACTOR AND RELATED METHOD TO ENHANCE MICROBIAL/ENZYME FUNCTION IN TRANSFORMING OR REMOVING CONTAMINANTS FROM A LIQUID

(71) Applicant: D. Jack Adams, Park City, UT (US)

(72) Inventor: D. Jack Adams, Park City, UT (US)

(*) Notice: Subject to any disclaimer, the term of this patent is extended or adjusted under 35 U.S.C. 154(b) by 0 days.

(21) Appl. No.: 14/831,666

(22) Filed: Aug. 20, 2015

(65) Prior Publication Data

US 2015/0353393 A1 Dec. 10, 2015

Related U.S. Application Data

(63) Continuation-in-part of application No. 13/001,962, filed on May 9, 2011.

(60) Provisional application No. 61/076,873, filed on Jun. 30, 2008.

(51) Int. Cl.
*C02F 1/00* (2006.01)
*C02F 9/00* (2006.01)
(Continued)

(52) U.S. Cl.
CPC ......... *C02F 3/005* (2013.01); *C02F 2003/003* (2013.01); *C02F 2101/101* (2013.01);
(Continued)

(58) Field of Classification Search
CPC ....... A61M 1/1696; A62D 3/02; B09B 2/00; B09C 1/00; B09C 1/10; B01D 33/70; B01D 33/80; B01D 35/00; C02F 1/00; C02F 1/46; C02F 1/50; C02F 1/70; C02F 1/722
USPC ................ 204/515, 516; 205/701, 742, 766; 210/150, 198.1, 601, 606, 614, 615, 210/632; 405/128.1
See application file for complete search history.

(56) References Cited

U.S. PATENT DOCUMENTS 3,616,356 A 10/1971 Roy
4,541,908 A 9/1985 Niki et al.
(Continued)

FOREIGN PATENT DOCUMENTS

DE 10245408 A1 4/2004
EP 0573226 A1 12/1993
(Continued)

OTHER PUBLICATIONS

Rene A. Rozendal et al., "Towards practical implementation of bioelectrochemical wastewater treatment", Trends in Biotechnology, Jun. 26, 2008, p. 450-459, vol. 26 No. 8, Elsevier Ltd.
(Continued)

*Primary Examiner* — Dirk Bass
*Assistant Examiner* — Hayden Brewster
(74) *Attorney, Agent, or Firm* — Kelly & Kelley, LLP

(57) ABSTRACT

A method for supplying freely available electrons to microorganisms and/or enzymes includes applying a voltage and amperage to electrodes to create a free electron field between the electrodes, thus directly supplying electrons to the microorganisms and/or enzymes to enhance the effectiveness of the microorganisms and/or enzymes. Supplying the microorganisms and/or enzymes with electrons enhance their effectiveness in transforming and/or removing one or more target compounds from the liquid to be treated.

38 Claims, 30 Drawing Sheets

902 Obtain site water sample
904 Obtain the water chemistry on the obtained water sample (including pH, ORP, metal, inorgamics, and TOC/BOD) and microbial community in the wastewater
906 Identify the contaminant(s), co-contaminants, reactants, and products of interest in site waters
908 Evaluate the Eh(V) and determine appropriate voltage potential to remove target contaminants in site waters
910 Select the appropriate microbial consortium for use in site waters
912 Inoculate a reactor / stabilize / immobilize microbes and/or enzymes
914 Place the electrodes within the reactors at locations to provide appropriate electron energy and electron gradient and connect to the voltage potential
916 Select/Adjust the appropriate voltage and amperage range
918 Analyze the effluent water quality including the concentration of the contaminant(s), co-contaminants, reactants, and/or products of interest of interest (including pH, ORP, metals, inorganics, and TOC/BOD)

(51) Int. Cl.

| | |
|---|---|
| ***C02F 3/00*** | (2006.01) |
| *B01D 35/00* | (2006.01) |
| *C02F 101/20* | (2006.01) |
| *C02F 101/10* | (2006.01) |
| *C02F 101/16* | (2006.01) |

(52) U.S. Cl.

CPC .... *C02F2101/103* (2013.01); *C02F 2101/106* (2013.01); *C02F 2101/163* (2013.01); *C02F 2101/20* (2013.01); *C02F 2201/4614* (2013.01); *C02F 2201/46135* (2013.01); *Y02W 10/37* (2015.05)

(56) References Cited

U.S. PATENT DOCUMENTS

| | | | | |
|---|---|---|---|---|
| 5,055,402 | A | 10/1991 | Greene et al. | |
| 5,271,831 | A | 12/1993 | Oremland | |
| 5,458,747 | A | 10/1995 | Marks et al. | |
| 5,643,453 | A | 7/1997 | Pannier et al. | |
| 5,879,555 | A | 3/1999 | Khudenko | |
| 5,919,351 | A | 7/1999 | Rijnaarts et al. | |
| 6,183,644 | B1 | 2/2001 | Adams et al. | |
| 7,147,776 | B2 | 12/2006 | Krier | |
| 7,427,526 | B2 | 9/2008 | Fonash et al. | |
| 2004/0165965 | A1 | 8/2004 | Unverzagt et al. | |
| 2004/0178149 | A1 | 9/2004 | Hernandez et al. | |
| 2005/0193827 | A1 | 9/2005 | Fischer et al. | |
| 2006/0027506 | A1 | 2/2006 | Musson | |
| 2007/0218540 | A1 | 9/2007 | Guiot et al. | |
| 2008/0292912 | A1* | 11/2008 | Logan | H01M 4/8878 429/2 |
| 2010/0059436 | A1* | 3/2010 | Lovley et al. | 210/601 |
| 2011/0229742 | A1* | 9/2011 | Shechter | C02F 1/46109 429/2 |
| 2016/0036083 | A1* | 2/2016 | Solina | H01M 8/16 429/2 |

FOREIGN PATENT DOCUMENTS

| | | | |
|---|---|---|---|
| JP | 3358388 | B2 | 12/2002 |
| WO | 92/18609 | A1 | 10/1992 |
| WO | 2008/029258 | A2 | 3/2008 |

OTHER PUBLICATIONS

M. Walczyk et al., "Electrochemical studies of the interaction between a modified activated carbon surface and heavy metal ions", Journal of Applied Electrochemistry 2005, p. 123-130, Springer 2005.

Richard L. McCreery, "Advanced Carbon Electrode Materials for Molecular Electrochemistry", Chemical Reviews, 2008, p. 2646-2687, vol. 108, No. 7.

Fabien Monnet, "Advanced Carbon Electrode Materials for Molecular Electrochemistry", Nov. 2003, Remade Scotland.

W. Carpentier et al., "Microbial Reduction and Precipitation of Vanadium by Shewanella oneidensis", Applied and Environmental Microbiology, Jun. 2003, p. 3636-3639, vol. 69, No. 6, American Society for Microbiology.

Dr. Kevin Gardner et al. "Electrochemical Remediation and Stabilization of Contaminated Sediments", The NOAA/UNH Cooperative Institute for Coastal and Estuarine Environmental Technology (CICEET), Dec. 8, 2005.

Pollak et al., "The Dependence of the Electronic Conductivity of Carbon Molecular Sieve Electrodes on Their Charging States", American Chemical Society, published on web Mar. 22, 2006, J. Phys. Chem B 2006, pp. 7443-7448.

Sanchez-Gonzalez et al., "Electrical Conductivity of Carbon Blacks Under Compression", Elsevier Ltd. published on web Dec. 9, 2004, pp. 741-747.

Watanabe et al. "Denitrification and Neutralization Treatment by Direct Feeding of an Acidic Wastewater Containing Copper ion and High-Strength Nitrate to a Bio-Electrochemical Reactor Process", Elsevier Science Ltd., vol. 35, No. 17, pp. 4102-4110.

* cited by examiner

| Parameter [mg/L] | Average Influent | Average Discharge | % Removal |
|---|---|---|---|
| Antimony | 0.15 | <0.001 | >99.3% |
| Cadmium | 0.014 | <0.0002 | >98.0% |
| Copper | 0.41 | <0.005 | >98.7% |
| Lead | 0.30 | 0.0008 | 99.7% |
| Molybdenum | 0.10 | <0.0005 | >99.5% |
| Selenium | 2.73 | 0.002 | 99.9% |
| Silver | 0.041 | <0.0001 | >99.8% |
| Zinc | 0.46 | <0.03 | >93.5% |
| Nitrate-N | 3.3 | <0.1 | >97.1% |
| Nitrate-N | 0.9 | <0.02 | >97.8% |
| Cyanide WAD | 0.26 | <0.005 | >98.1 |
| Cyanide Total | 0.47 | <0.005 | >98.9 |

ELECTROBIOCHEMICAL REACTOR AND RELATED METHOD TO ENHANCE MICROBIAL/ENZYME FUNCTION IN TRANSFORMING OR REMOVING CONTAMINANTS FROM A LIQUID

RELATED APPLICATION

This application is a continuation-in-part of U.S. application Ser. No. 13/001,962, filed on May 9, 2011, which application is the national stage entry of PCT/US2009/043830, filed on May 13, 2009, and claims the benefit of U.S. Provisional Patent Application Ser. No. 61/076,873, filed on Jun. 30, 2008.

BACKGROUND OF THE INVENTION

The present invention generally relates to devices and methods for removing target contaminant compounds from a liquid, such as water. More particularly, the present invention relates to a method for enhancing microbial/enzyme robustness and performance by directly supplying them with electrons/electron acceptor rich environment, such as in an electrochemical bioreactor (EBR), to facilitate transformation and/or removal of target compounds from a liquid at a significantly higher rate and greater efficiency possible than in conventional bioreactors with significantly less biomass production.

Metals and other inorganics like arsenic, selenium, mercury, cadmium, chromium, nitrogen, etc. are difficult to remove to levels that meet current drinking water and discharge criteria in many countries. For example, in the United States, the 2006 maximum arsenic level in drinking waters was set at 10 ppb; this may soon be the case in other countries. Maximum contaminant levels (MCL) of metals in drinking water in the United States can range 0.0005 to 10 mg/L, and can be even lower. Commonly regulated metals and inorganics include antimony, arsenic, barium, cadmium, chromium, copper, cyanide, fluoride, lead, mercury, nitrate, nitrite, selenium, sulfate, thallium and zinc.

There are various kinds of treatment methods for metal, inorganics, and organics removal. Physical, chemical and biological technologies used to treat metal and inorganic-contaminated water including: membrane treatments such as reverse osmosis and nano filtration; ion exchange and sorption; physical/chemical precipitations and physical separations; and various biological treatments that usually refer to the use of bacteria in engineered reactor systems for effecting the removal and/or transformation of contaminants through the addition of nutrients.

All chemical reactions or transformations require the exchange of electrons; this occurs through well-documented oxidation-reduction (ORP) reactions. ORP reactions are termed half reactions that require a loss of electrons (oxidation reactions) and a second set of concurrent reactions that require a gain of electrons (reduction reactions). These reactions are measured through reduction potential, sometimes referred to as redox potential or oxidation/reduction potential, ORP as measured in volts or Eh(V), voltage or concentration of electrons and pH a measure of the concentration of hydrogen ions. This means that electrons must be added from some reactants and removed from other reactants for the reactions to take place. ORP reactions also occur at different energy yields or requirements; the more positive the ORP the greater the energy yield. The more negative the ORP, the greater the energy requirement. There is also, in most ORP reactions, an energy of activation that is needed to have the reaction move toward the reactant products. This energy can be supplied to the system in various manners, for example heat, chemical electron donors such as sugars, or easily available electrons.

Biological wastewater treatments are based on microbial transformations of contaminants (reactants). Microbes mediate the removal of metal and inorganic contaminants through electron transfer (redox processes). For example, denitrification and selenium reduction can be described by the following redox reactions:

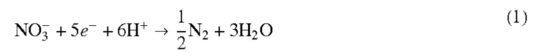

$$NO_3^- + 5e^- + 6H^+ \rightarrow \frac{1}{2}N_2 + 3H_2O \quad (1)$$

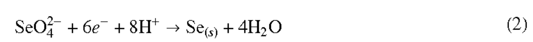

$$SeO_4^{2-} + 6e^- + 8H^+ \rightarrow Se_{(s)} + 4H_2O \quad (2)$$

Both biotransformations shown in reactions 1 and 2 occur under anaerobic, reductive conditions, thus require low dissolved oxygen (DO) levels and a negative ORP (oxidation/reduction potential) environment. Eleven electrons are needed to reduce one molecule of selenate and one molecule of nitrate to elemental selenium and nitrogen gas. Other co-contaminants or reactants present, such as arsenate and oxygen, would add to the electron demand (all other electron acceptors present that accept electrons at the same or lower energy level).

As an example of a chemical microbial electron supply, glucose is often used as a cost-effective microbial electron donor and ORP adjustment chemical. In microbial biotreatment systems one molecule of glucose can provide up to 24 electrons with complete metabolism under optimal conditions (usually measured in 24 to 72 hours). In environmental and other applications, this efficiency or the amount of available electrons actually realized is usually considerably less because energy is required for metabolism and is lost due to system influences or slowed due to temperature. Furthermore, only a few of these electrons are available within the first 6 to 8 hours, requiring a large excess of organic electron donors to approach the desired number of electrons needed for microbial mediated contaminant removals in the 6 to 8 hour time frame needed to keep bioreactor sizes reasonably small.

In conventional biological treatment systems, excess nutrients are added to the system to provide electrons needed for 1) microbial growth, 2) various contaminant biotransformations (reactants such as metals and inorganics), 3) ORP adjustment; 4) to compensate for overall system sensitivity, and 5) to supplement decreased metabolic and enzymatic rates, such as at low temperatures that slow metabolism and reaction rates resulting in electrons being provided at slower rates or in electron 'needy' environments that yield fewer electrons for microbial use. As an example, nutrients added to a biotreatment system only yield electrons for microbial use upon metabolism. This requires addition of excess nutrients that adds significantly to both capital expenditures (CAPEX) and operating expenditures (OPEX) costs. The use of excess nutrients results in higher microbial nutrient consumption directed to the production of greater numbers of microbial cells (excessive biomass) due to the provision of carbon, nitrogen, phosphate, and/or sulfur with organic nutrients; excess biomass must be removed and properly disposed of, as it will contain contaminants found in the system, this also increases CAPEX and OPEX costs.

Accordingly, there is a continuing need for methods and systems for effectively and efficiently removing targeted contaminant compounds from liquids, such as drinking water and other water sources. The present invention fulfills these needs, and provides other related advantages.

SUMMARY OF THE INVENTION

The present invention resides in systems and methods for removing one or more target compounds from a liquid, typically contaminants from wastewater. The method, in accordance with the present invention, supplies electrons directly to the system and microorganisms and/or enzymes present therein, or within the treatment area, to effect an improvement in the metabolic health, metabolic performance (kinetics and effectiveness), and robustness of selected microorganisms and/or enzymes to facilitate their transformation and/or removal of one or more target compounds to be transformed and/or removed from the liquid.

The liquid is analyzed to determine liquid chemistry, including the target compound to be transformed and/or removed from the liquid. Chemical reactions required to transform and/or remove the target compound from the liquid are determined. This may comprise the step of determining the oxidation/reduction half reactions required to transform the target compound.

Microorganisms and/or enzymes that would facilitate the transformation of the target compound and/or remove the target compound from the liquid are identified. A population of the identified microorganisms and/or enzymes is developed within the liquid to be treated and/or on surfaces, other than electrode surfaces, within a treatment area. The microorganisms and/or enzymes may be conditioned to increase utilization of directly supplied electrons. If multiple target compounds are to be transformed and/or removed from the liquid, multiple types of microorganisms and/or enzymes might be identified and developed so as to facilitate the transformation and/or removal of the target compounds from the liquid.

A plurality of spaced apart electrodes are arranged relative to a treatment area. The electrodes, typically comprised of a stable material, are nonreactive as to the transformation or removal of the target compound and instead are used to directly supply electrons to the microorganisms and/or enzymes when a voltage and amperage is applied to the electrodes, so as to create a free electron field between the electrodes. The voltage and the amperage are within a range that effectuates an improvement in the removal or transformation of the target compound by the microorganisms and/or enzymes and is insufficient to reduce or damage the population of microorganisms and/or enzymes. The number and arrangement of electrodes is determined by the analysis of the liquid chemistry, including Eh(V), pH, and/or half reactions and interactions in order to adjust the number of directly supplied electrons available per second to the microorganisms and/or enzymes.

The voltage and amperage needed by the microorganisms and/or enzymes to transport the target compound is calculated based on determined oxidation/reduction half reactions required to transform the target compound. The voltage and/or amperage may be adjusted to optimize the microorganism and/or enzyme target compound transformations based on chemical energies and number of electrons required at a determined liquid pH. The applied voltage may be approximately five volts or less and the applied amperage may be between 0.01 to 2,500 milliamps. In some cases, the applied voltage may be five volts or less and the applied amperage between 0.01 to 70 milliamps. In other cases, the applied voltage may be five volts or less and the applied amperage between 70 and 2,500 milliamps.

The population of microorganisms and/or enzymes may be developed prior to or concurrent with the creation of the free electron field. High surface area support surfaces, separate from the electrodes, may be placed within the flow of the liquid to support the microorganisms and/or enzymes. The support surfaces may be activated to increase the microorganism and/or enzyme support capacity of the support surfaces. The support surface may comprise an activated carbon material.

The directly supplied electrons enhance the effectiveness of the microorganisms and/or enzymes in removing or transforming the target compound. The directly supplied electrons affect an improvement in the performance and robustness of the population of microorganisms and/or enzymes. The directly supplied electrons are freely available to the population of microorganisms and/or enzymes within the electron field without metabolism of nutrients, materials and/or electron donors.

The target compound may comprise a metal or inorganic compound to be transformed and/or removed from the water or other liquid. The target compound may comprise selenium, arsenic, mercury, a nitrate or a sulfate.

The treated liquid may be tested to determine that the target compound transformation and/or removal is occurring at a predetermined rate and/or amount. The target compound may be recovered from the liquid. The voltage and/or the amperage applied to the electrodes may be adjusted to alter the density and/or energy of the free electrons within the electron field, such that target compound transformation and/or removal by the microorganisms and/or enzymes occur at an improved rate and/or efficiency.

The transforming and/or removing of the target compound may be done in-situ. The method of the present invention may also, or instead, comprise a first enclosed bioreactor having electrodes associated therewith for creating a supply of freely available electrons within an electron field within the bioreactor, as well as microorganism and/or enzyme support surfaces disposed between the electrodes and a liquid inlet and a liquid outlet of the bioreactor.

A second bioreactor may be provided in fluid communication with the first bioreactor. The second bioreactor has support surfaces therein supporting microorganisms and/or enzymes for removing or transforming a target compound from the liquid, and electrodes associated therewith for creating a free electron field within the second bioreactor. The electrode placement and/or microorganisms and/or enzymes in the second bioreactor may be different than the microorganisms and/or enzymes of the first bioreactor for removing or transforming a second target compound from the liquid.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
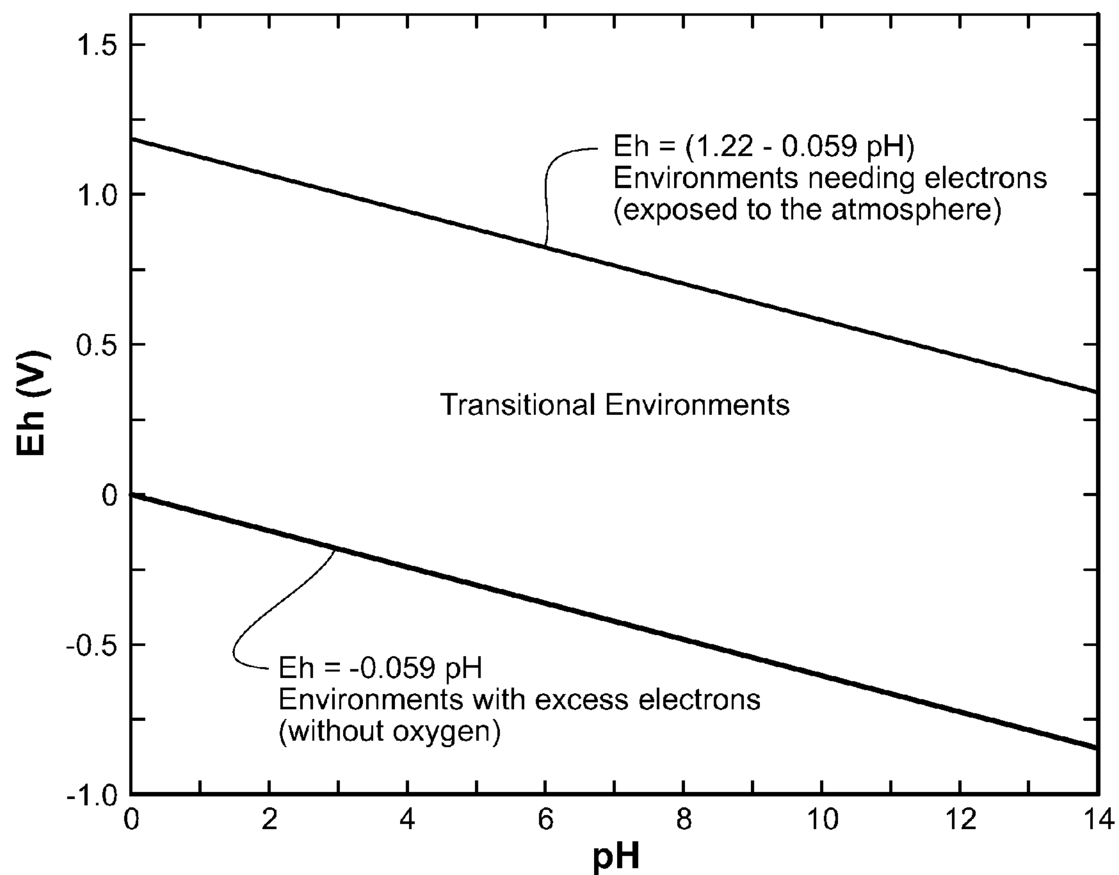
FIG. 1 is a graph illustrating the Eh-pH relationship in transitional environments.

Reference will now be made to exemplary embodiments, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention. Definitions in describing and claiming the present invention, the following terminology will be used in accordance with the definitions set forth below.

It must be noted that, as used in this specification and the appended claims, the singular forms "a," "an," and "the" include plural referents unless the context clearly dictates otherwise. Thus, for example, reference to "an active surface" includes one or more of such active surfaces and reference to "a developing step" includes reference to one or more of such steps.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of or the like refers to the lack of an identified material, characteristic, element, or agent in a composition. Particularly, elements that are identified as being "substantially free of are either completely absent from the composition, or are included only in amounts that are small enough so as to have no measurable effect on the composition.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, thicknesses, parameters, volumes, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

This invention and methods are described as an electro-biochemical reactor (EBR) technology. It accounts for enhancements and increased efficiencies discovered by providing electrons directly to microbes or enzymes; on surfaces, in biofilms, or in suspensions. The EBR technology provides an enhanced electron availability and/or electron donor environment over or above that occurring with nutrient metabolism or shuttle compounds. The electro-biochemical technology enhances the kinetics, transformation rates, and efficiencies of microbial and enzyme reactions and broadens the conditions under which microbial-mediated oxidation-reduction reactions transformations occur. For example it allows transformations to be completed at lower reactant concentrations or lower temperatures. The method is broadly applicable to both microbial and enzymatic reactions normally requiring electron exchanges, electron shuttle compounds or other chemical and physical mechanisms for the addition or removal of electrons. This invention encompasses provision of electrons by providing an electron and electron acceptor rich environment where the electrons are available to microbes and enzyme for reactions without concomitant need for nutrient metabolism, shuttle compounds, or being directly associated with an electrode.

Outside this invention, the EBR technology, the current state-of-the-art surrounding direct electron provision and utilization by microbes indicates that it is somewhat accepted that a very limited number of microbial species, i.e., *Geobacter* species, can utilize directly provided electrons from shuttle compounds or when microbes are directly associated with an electrode. In the current literature, *Geobacter* species have been shown to produce higher current densities than any other known organism in microbial fuel cells and are common colonizers of electrodes harvesting electricity; this is the direct opposite of this invention. Direct electron exchange between different *Geobacter* species is speculated to occur. This invention demonstrates microbial use of directly supplied electrons as a sole electron source in limited examples of anaerobic respiration.

In accordance with the present invention, as mentioned above, numerous microorganisms and/or enzymes are capable of using and/or can be stimulated to use directly supplied electrons in connection with the systems and methods of the present invention. In this invention, the microbes do not require shuttle compounds, or to be directly associated with an electrode or organic materials, such as glucose, for a supply of electrons in order to mediate the transformation of target contaminant compounds, or to assist in the stabilization of the system ORP. Nor does the present invention utilize electrolysis, which would damage or destroy the microorganisms and/or enzymes.

The oxidizing-reducing potential (ORP) is a measure of the relationship between the abundance/lack of electrons (Eh) and protons (pH) in the environment. The conventional bioreactor controls the Eh by addition of organics that when metabolized by microbes supply electrons to the microbes and if enough organic is added, to the reactor environment. As shown in FIG. 1, as electrons are added the ORP (Eh) moves toward a lower energy environment, the lower the Eh the higher the energy required to supply the electrons needed to adjust the environment.

Table 1 below shows a general reaction Eh sequence for neutral pH (pH7). These are specific energies for pure solutions where in natural water chemistry environments these values would be represented by an Eh(V) range.

TABLE 1

| Reaction | Eh(V) |
|---|---|
| $\frac{1}{2}O_2 + 2H^+ + 2e^- = H_2O$ | +0.816 V |
| $NO_3^- + 6H+ + 5e- = \frac{1}{2}N_2 + 3H_2O$ | +0.713 V |
| $MnO_2 + 4H^+ + 2e^- = Mn^{2+} + 2H_2O$ | +0.544 V |
| $NO_3^- + 2H^+ + 2e^- = NO_2^- + H_2O$ | +0.431 V |
| $NO_2^- + 4H^+ + 3e^- = N_2 + 2H_2O$ | |

Table 1 shows that 1) reactions producing electrons need a place for the electrons to go (+V) in order to achieve optimal reaction kinetics; 2) reactions requiring electrons (−V) must have electrons provided in order to occur; microbes and enzymes can mediate and enhance these transformations when the proper amount of electrons and hydrogen ions are available. In a simplified explanation, this shows that at a given pH, there is an optimal Eh(V), energy for specific reactions to occur. This optimum Eh(V) is based on the amount of electrons available and the energy needed to transform the desired reactants like nitrate, selenate, arsenate, sulfate, etc.; with sulfate requiring more energy to transform than does nitrate.

The optimal specific reaction Eh(V) is influenced by the pH, water chemistry, temperature, microbe type and numbers, and a number of other factors that make the optimal Eh(V) an Eh(V) range. This is because the environment is often in a state of flux and as electrons are supplied to the environment, the environmental constituents change and thus so does the specific reaction optimum within the environment. Thus, within a complex environment, there is a trend towards an optimal Eh(V) for a specific reaction with a given Eh(V) range.

In removal of metals and inorganics like selenate/selenite and nitrate; these compounds have oxygen associated with them that require electrons to allow oxygen to be separated from selenium and nitrogen. When these electrons are provided, selenate/selenite and nitrate are reduced to elemental selenium and nitrogen gas.

As an example, nitrate reaction to nitrogen gas and the electrons required is provided by:

$$NO_3^- + 5e^- + 6H^+ \rightarrow \frac{1}{2}N_2 + 3H_2O.$$

The reduction of arsenic As(V) to As(III) occurs at redox levels corresponding within the nitrate-reducing range as does the reduction of selenate to selenite.

$$Fe(OH)_3+3H^++e^-=Fe^{2+}+3H_2O+0.014\text{ V}$$

$$SeO_4^{2-}+e^-=SeO_3^{2}$$

$$Fe^{2+}+SO_4^{2-}+16H^++14e^-=FeS_2+8H_2O-0.156\text{ V}$$

As a second example, the reduction range of selenite to elemental selenium or metal selenides ($SeO_3^{2-}+e^-=Se$) starts within the Fe reduction range when the redox or Eh(V) drops below +50 mV and continues through −150 mV. An example of selenate reaction to elemental selenium and the electrons required is provided by:

$$SeO_4^{2-}+6e^-+8H^+\rightarrow Se_{(s)}+4H_2O.$$

$$S^o+2H^++2e^-=H_2S-0.181\text{ V}$$

$$SO_4^{2-}+10H^++8e^-=H_2S+4H_2O-0.217\text{ V}$$

$$HCO_3^-+9H^++8e^-=CH_4+3H_2O-0.260\text{ V}$$

$$S_2O_4^{2-}+4e^-=CH_2O+H_2O\text{V}$$

Figure 2:
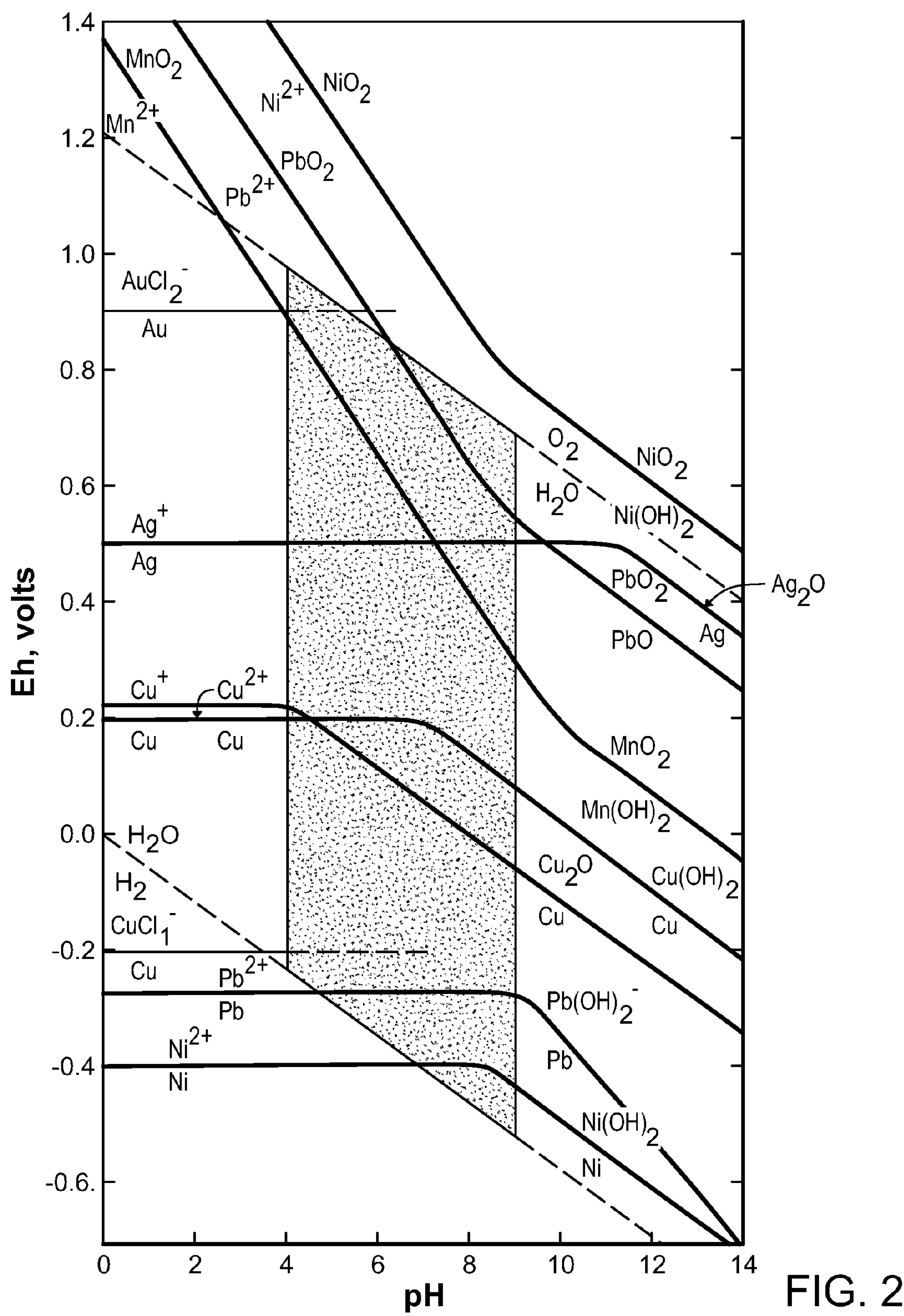
FIGS. 2 and 3 are graphs providing examples of classical chemical ORP (Eh(V)) associations via Eh-pH diagrams indicating metal form and/or relative form stability present and arsenic forms present at different Eh(V)
Figure 3:
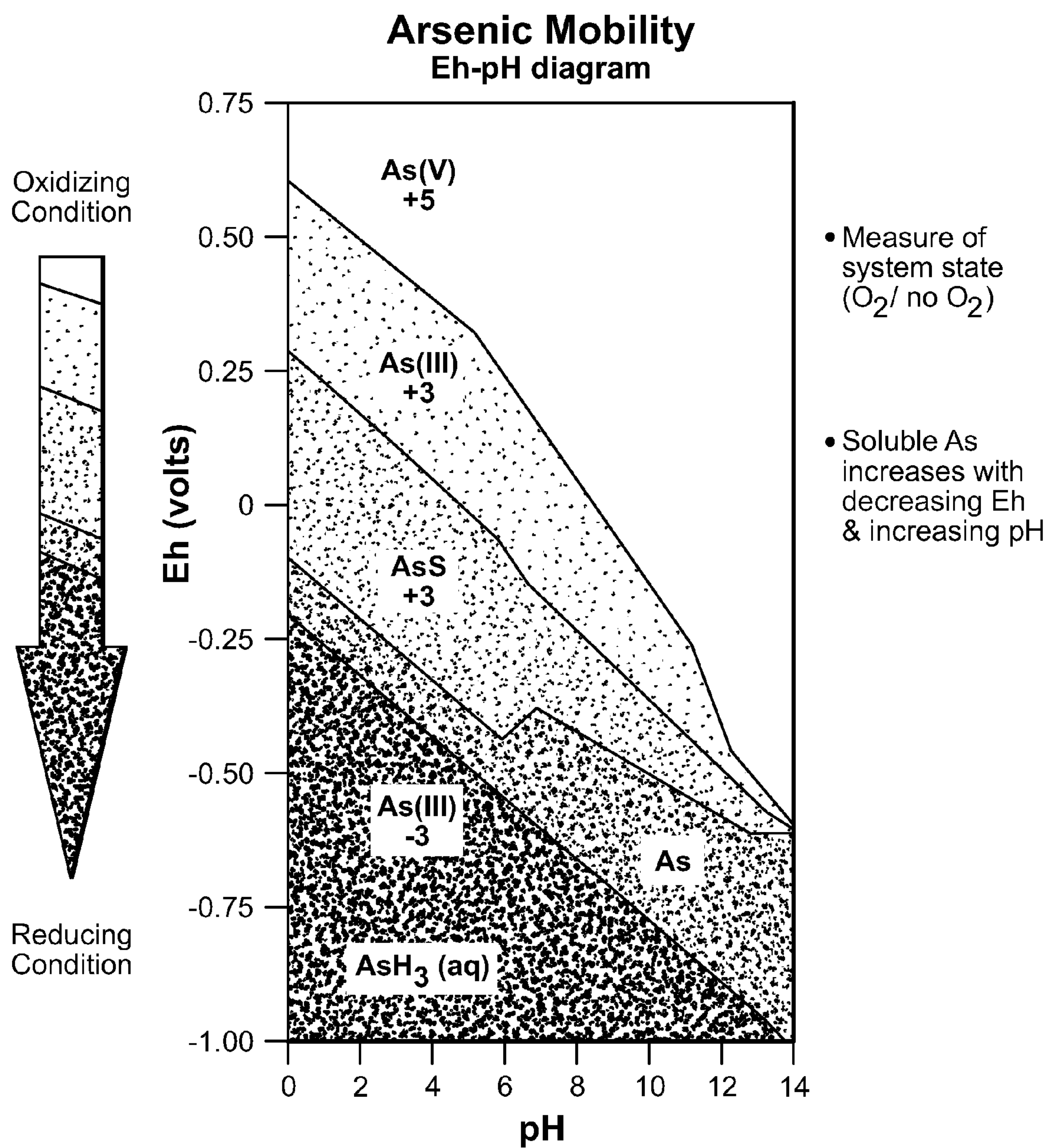

The optimal ORP for the chemical transformation of single and multiple contaminant removals is found in the current literature and can be modeled via standard and generated Pourbaix diagrams. A Pourbaix diagram, also known as a potential/pH diagram, EH-pH diagram or a pE/pH diagram, maps out possible stable (equilibrium) phases of an aqueous electrochemical system. These diagrams and ½ reaction equations predict the number of electrons needed for specific reactions to occur. Lines represent predominant ion boundaries; an example for general metals and arsenic are provided in FIGS. 2 and 3. FIGS. 2 and 3 are examples of classical chemical ORP or Eh(v) associations via eh-pH diagrams, indicating metal form and/or relative form stability present and arsenic forms present at different Eh(v).

Generally, redox processes can be mediated by microorganisms and/or enzymes, which serve as catalysts in speeding up the reactions. Microbes and enzymes can accelerate these reactions and in some instances greatly accelerate these reactions to 1,000 to >10,000 fold. These microorganisms, including many bacteria, can use redox reactions in the respiratory processes. These chemical reactions are performed by microbes and enzymes that have slightly different optimal conditions and efficiencies in performing these reactions, but they occur within the discussed general Eh(v) indicated above.

The microorganisms and/or enzymes can act to remediate a target compound from the liquid. In this invention, directly provided electrons provide microbial/enzymes access to freely available electrons that permit performance enhancement in both kinetics and effectiveness. In one embodiment, microbes can convert nitrates or nitrites to nitrogen gas using them as terminal electron acceptors. Excess nitrate or nitrite present receives electrons in a completely microbial mediated transformation. In another embodiment, microbes mediate selenates and selenites reduction to elemental selenium. In still another embodiment, microbes mediate As(V) reduction to As(III) and, in the presence of sulfides, As(III) can be precipitated as $As_2S_3$. As such, the electrobiochemical reactors provide reductive environments rich in free electrons to mediate microbial conversion to insoluble forms or degraded to carbon dioxide and other gases, e.g. microbial reactions mediated by the microbes using the directly added electrons that are distributed throughout the active surfaces by the electrodes.

In the past, microorganisms have been used in these processes, but carbon sources and nutrients, such as molasses, yeast extract, proteins and the like, were used in large quantities to not only build up the population of the microorganisms but also to act as electron acceptors and donors during the chemical reactions performed by the microorganisms. However, in accordance with the present invention, a limited amount of organic and inorganic nutrients are needed by the microorganism population for cell synthesis and growth. The invention is directed to the generation of a free electron field, wherein electrons are directly supplied to the microorganisms and/or enzymes without the energy expenditure associated with metabolism or shuttle compounds.

It has been found that directly supplying electrons to the microorganisms and/or enzymes effectuates a significant improvement in the removal or transformation of the target compound by the microorganisms and/or enzymes and enhances the effectiveness of the microorganisms and/or enzymes in removing or transforming the target compound so long as done within an effective range that does not reduce or damage the population of microorganisms and/or enzymes. It has also been demonstrated that the directly supplied electrons effect and improvement in the metabolic health, performance and robustness of the population of microorganisms and/or enzymes. The directly supplied electrons which are freely available to the population of microorganisms and/or enzymes within the electron field enable the microorganisms and/or enzymes to perform the chemical transformations without metabolism of materials and/or electron shuttle compounds or electron donors.

The invention and methods described as the electrobiochemical reactor (EBR) system are characterized by methods that (1) provide electrons to microbes and/or enzymes directly from and at distance from non-sacrificial electrodes placed within in the treatment system; (2) a method for providing electrons that is non-electrolytic and utilizing non-sacrificial electrodes to supply the electrons to the microbes and enzymes; 3) selection and increasing both the number and types of microbial species that can effectively utilize directly supplied electrons for transformation of selected reactants or contaminants by cultivating them in the EBR environment. The electrons are provided to microbes/enzymes both on all surfaces within the treatment environment and at large distances from electrodes through the water and the microbial biofilm on all surfaces within in the EBR treatment system environment. The electrons, supplied directly from an electrode, enhance (increase) the rate and range of microbial/enzymatic transformations within the EBR treatment system. This is accomplished without the production of excess biomass or other adverse effects due to chemical addition; but rather this is accomplished by providing a treatment environment with an abundance of electrons and electron acceptors, which are readily available to the microbes within the system without having to metabolize nutrients or other chemical reactions to access the electrons. An electron rich 'free' electron environment makes an abundance of electrons readily available to microbes/enzymes under many different environmental and water chemistry conditions, such as lower temperatures when electron availability becomes limited due to slow nutrient metabolism. It provides a readily available non-chemical electron supply for microbial/enzymatic transformations. The amount of added electrons, themselves, is not sufficient, without microbial or enzymatic participation (like catalysts), to remove or transform a significant amount of the targeted reactants.

The electron transfer between the electrodes and microbes is mediated via free electron field or gradient that is established within the entire electro-biochemical reactor (EBR) environment. These electron rich environments vary in free electron density in relationship to multiple variables such as distance from and between electrodes, type of electrode surfaces, water chemistry, electrode potential—applied voltage and amperage, and other variables. The free electrons in the EBR environments are available to microbes/enzymes via several mechanisms that assist the microbial use of the free electrons provided to the microbial population in the EBR system.

The invention is directed to electro-biochemical reactions that provide electrons directly to microbes and enzyme mediated reactions, thus electro-biochemical technology, that can be employed in many environments including in some in-situ environments and in electro-biochemical reactor environments of different sizes and configurations. We have demonstrated that many different microbes are capable of using directly supplied electrons to varying degrees at distance from the electrode and on surfaces, in biofilms, and in suspension to 1) maintain and enhance cell function; 2) to enhance reaction or transformation kinetics and efficiencies;

3) to help stabilize the oxidation-reduction potential (ORP) in the affected environment adjustment; 4) to compensate for overall environmental electron need changes over time; and 5) to supplement electrons during decreased metabolic and enzymatic rates, such as occur at low temperatures that slow metabolism and yield electrons a slower rates.

Figure 4:
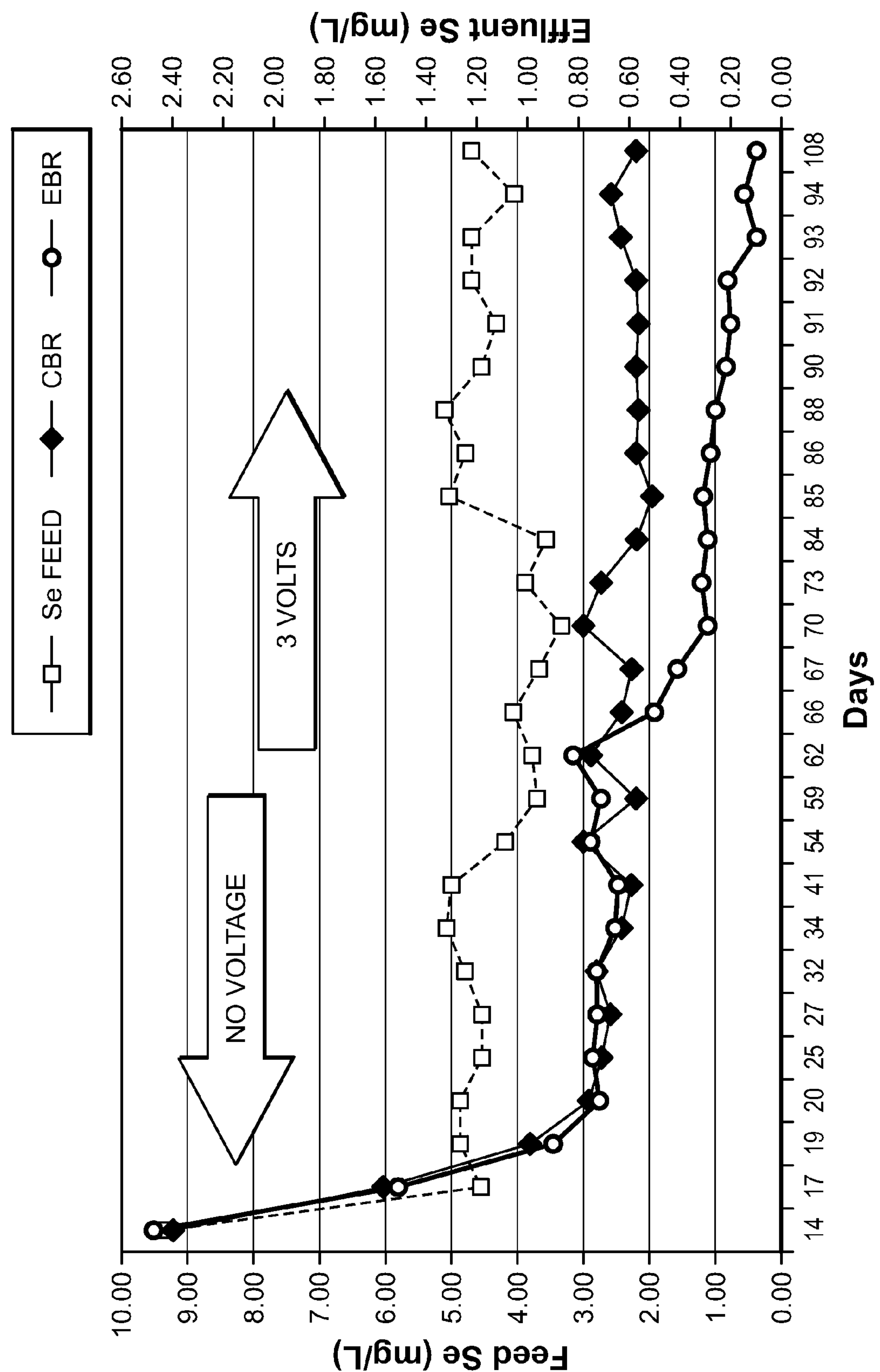
FIG. 4 is a graph depicting selenium removal using a conventional bioreactor as compared to an electrochemical bioreactor embodying the present invention.

With reference now to FIG. 4, a graph is shown illustrating the removal of selenium from a liquid containing selenium compared to a conventional bioreactor (CBR) that did not directly supply electrons to the microorganisms and/or enzymes or in other words did not have any voltage applied to electrodes associated therewith, and a electrochemical bioreactor (EBR) embodying the present invention which supplied electrons at three volts potential. It can be seen that although the CBR did remove selenium to a certain extent, the EBR removed the selenium to a much greater extent.

The EBR can have multiple configurations and electrode configurations to supply electrons directly to the microbes and enzymes at distance from the electrodes, through establishment of an electron field throughout the treatment environment or bioreactor at milliamperage ranges. As an example, 1 mA provides $6.24\times10^{15}$ electrons per second to the electron field between the anode and cathode. Adjustment of the voltage (energy) and amperage (electrons) supplied to the bioreactor environment affects both the energy and number of electrons being provided and thus allows specific reactions or biotransformations to be targeted under different water chemistries where these reactions are difficult to sustain. The amperage range is selected to supply electrons to the microbes and enzymes and not cause significant electrode chemistry interactions. The selection of voltage and the desired amperage range is accomplished through evaluations of water chemistry, microbial type and density, and testing to verify the selected relative number of electrons needed in a specific water chemistry environment and within the seasonal variation range observed in a site water chemistry.

Figure 5:
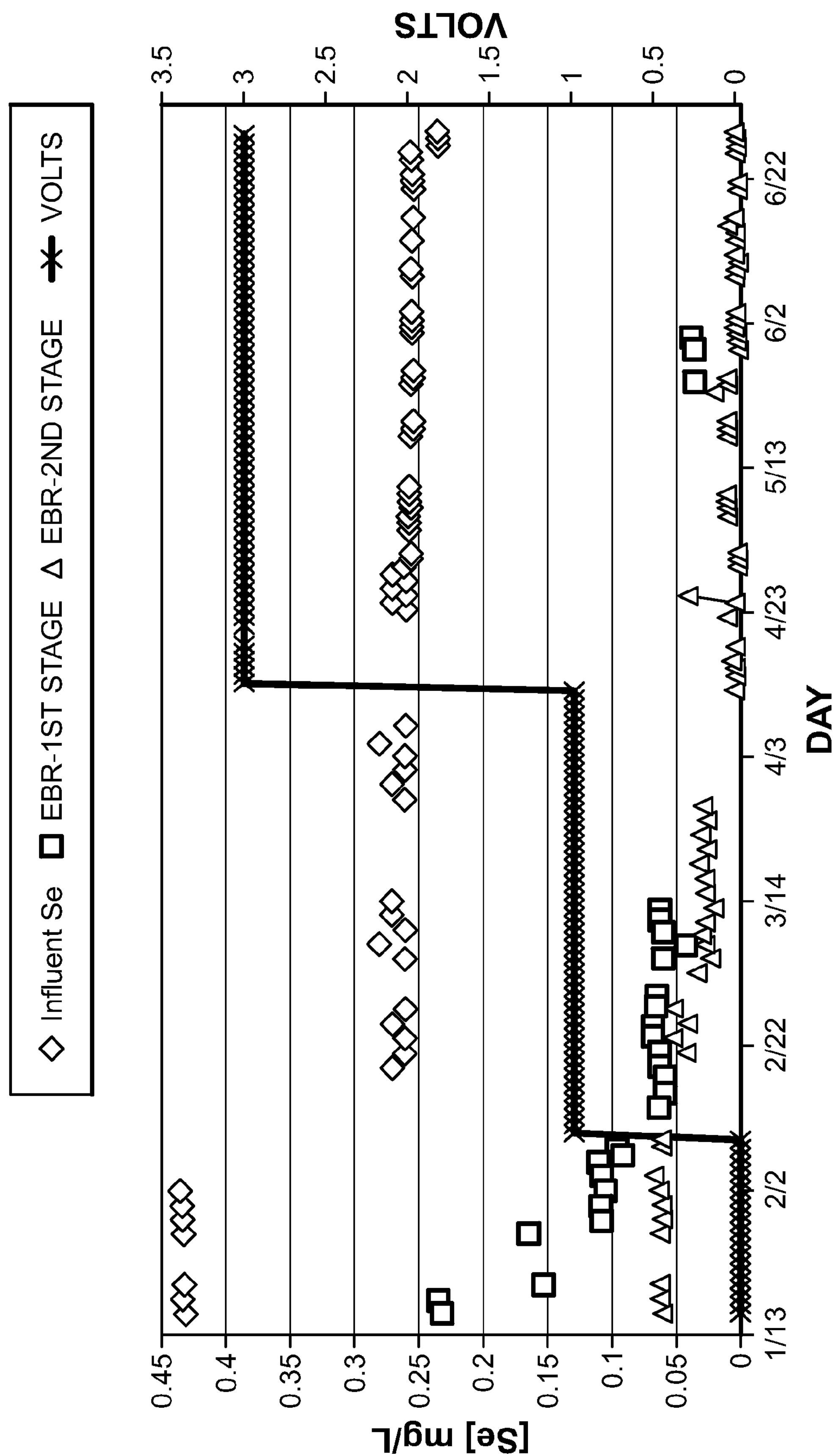
FIG. 5 is a graph depicting selenium removal in an electrobiochemical reactor operated at different voltage potentials.

With reference now to FIG. 5, selenium removal is illustrated in an EBR operated without applied potential, with one volt, and with three volts potential. As can be seen in this figure, the directly supplied electrons, provided at different voltage potentials, have a significant effect on the removal of selenium.

The amount of electrons used within the bioreactor is kept within the selected range, to achieve the desired microbial transformations, and is allowed to self adjust within this range as the influent water chemistry fluctuates. Example calculations and testing results to determine appropriate specific reaction optimum voltages and amperage ranges are presented below. Voltage selection is based on the target contaminants, for example a combination of the required energy from the equations above and microbial testing.

Empirical and quantitatively determinations of the amount of electrons needed are mostly based on the sums of the major water chemistry constituents obtained from the equations below. This value is adjusted by including the relative number of microbes performing the desired transformations. Using known equations, such as those above, including from Table 1, modified through site water examination:

$$Oc+xH^{+}+ye^{-}\rightarrow Rc \quad 1)$$

Oc is the oxidized component or electron acceptor, Rc is the reduced component, x is the number of hydrogen ions involved in the reaction and y is the number of electrons needed for microbes or enzymes to complete the reaction. In a conventional bioreactor, organic matter supplies the electrons used, excess electrons (nutrients) are also needed because of time of metabolism and electron yield and system inefficiencies. The energy required is defined quantitatively through the change in Gibbs free energy for the major oxidized and reduced components of the system that are at the same energy level or higher energy yield as the desired reactants in the system.

$$(\Delta G)=\Delta G^{o}+RT\ln(Rc/(Oc)(H^{+})^{x}) \quad 2)$$

Where $\Delta G^{o}$ is the standard free energy change, R is the gas constant, and T is absolute temperature.

$$\Delta G^{o}=\Sigma Oc-\Sigma Rc \quad 3)$$

$\Delta G^{o}$ for each of the major oxidized components and reduced components vary and example energies are given above. The Eh(V) or voltage potential needed by the system increases with increased Oc, decreases with increased Rc, increases with decreases in pH, and is influenced by the microbial type and numbers within the system.

Selecting a higher than optimal voltage potential or amperage adds additional energy to the environment or bioreactor and results in undesirable reactions, such as production of excess hydrogen sulfide. Adding too few electrons results in less than desirable contaminant removals. This also occurs in conventional bioreactors if excess nutrients, electron donors, are added to the system, or not enough nutrient is added. As an example, the reactions to reduce sulfate to hydrogen sulfide requires more energy than do reactions to reduce nitrate and selenate/selenite, but these environments overlap somewhat within the gradients formed within the bioreactors microenvironments.

Figure 6:
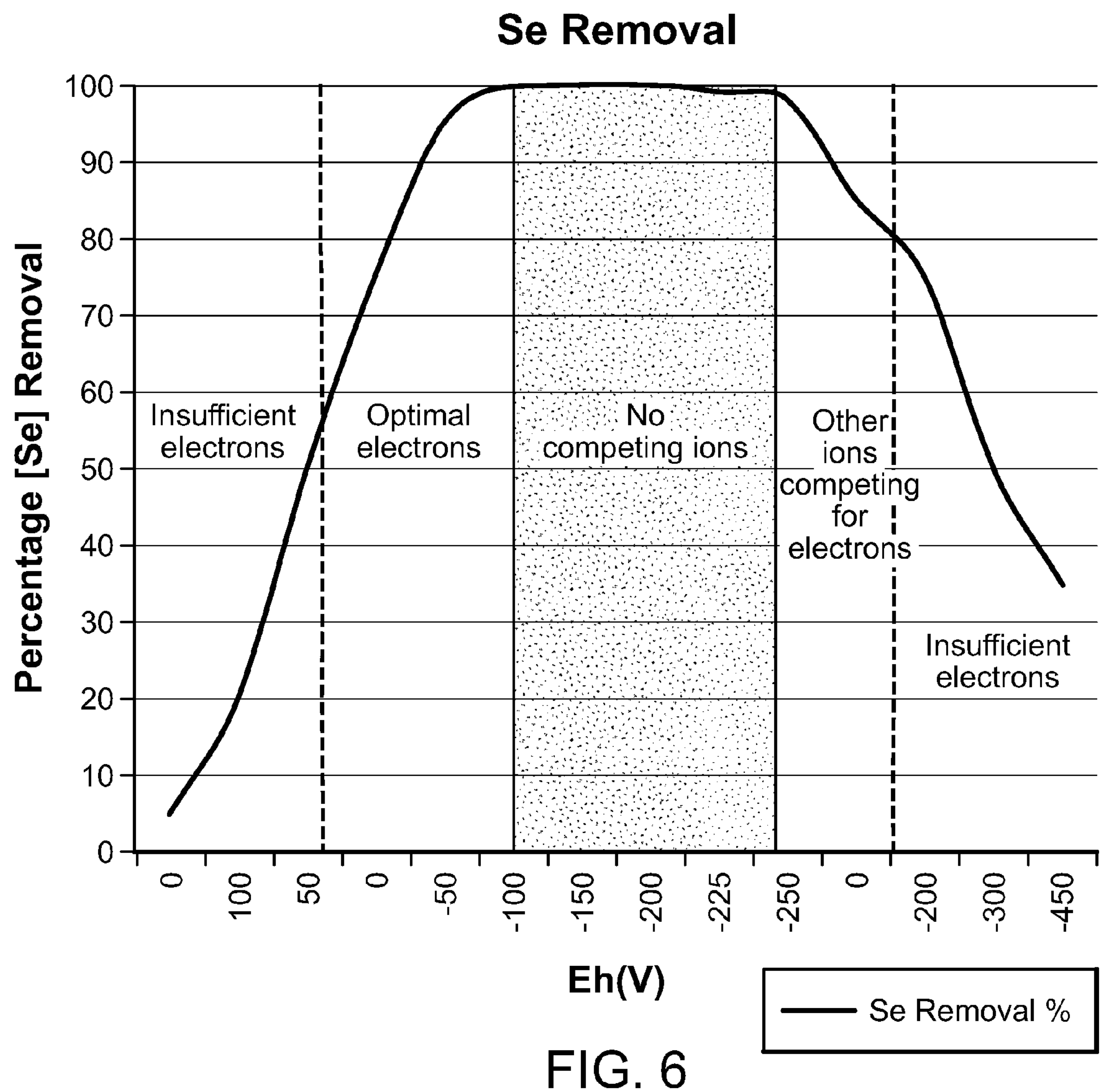
FIG. 6 is a graph depicting ORP/Eh(V) optimization of electrochemical bioreactor systems, in accordance with the present invention.

With reference now to FIG. 6, a graph is provided illustrating the need for ORP [Eh(v)] optimization of EBR systems based on ions competing for electrons and/or biotransformation preferences.

Typically, the applied voltage is five volts or less and the applied amperage is between 0.01 to 2,500 milliamps. In some cases, the applied amperage can be between 0.01 and 70 milliamps. As interfering ions are added, microbes mediate movement of electrons to selected ions resulting in the greatest energy yield, thus these ions may compete with selenium for electrons and at some concentration start to lower the amount of selenium removed as elemental selenium. At this point, additional electrons can be added through adjustment of the amount of total amps in the system and/or increasing the voltage as appropriate. For example, if more energy is required the voltage is increased, or if there are greater amounts of more easily reduced reactants, the milliamps to the system is increased. For example the applied amperage may be between 70 and 2,500 milliamps. This would be the case with highly oxidized waters or waters containing large amounts of nitrate. As mentioned, the directly provided electrons provide metabolism free energy to the microbes and to the immediate environment around the microbes where the free electrons moving through the system can, with microbial action, mediate and/or enhance the desired biotransformations providing the electrons are present in sufficient quantity and energy. In simple water chemistry environments, those with only one or two contaminants (usually a laboratory setting) the direct provision of electrons can influence the ORP in the EBR system at a macroscale.

As an example, the MtrCAB pathway is a protein complex that transports metabolic electrons across the cell membranes to metal oxides and minerals at the extracellular surface of microbes such as *Shewanella. oneidensis* and others that are capable of using this and cytochrome systems to reduce metal oxides in environmental conditions where oxygen is not available. The EBR system optimizes the number of electron pathways and systems synthesized per cell. The EBR invention 1) supplies free electrons, needed for all ORP half reactions to the system microbes (free electrons—available to the microbe without the need for metabolizing a carbon source); 2) Enzymes have been demonstrated to use directly provided electrons as effectively as electrons provided by shuttle compounds (electron carrying donor compounds); and 3) by exposing various genus and species of microbes capable of metal and inorganic transformation to free electrons within the EBR system it provides the microbes energy to increase the expression of the ability to utilize directly provided electrons which can increase electron transport and utilization of free electrons through an increase in surface expressed cytochromes and other electron transport physical and chemical attributes.

This capability has been demonstrated to increase with increased exposure time to directly provided electrons and has been shown to continue after direct electron provision has been discontinued, but dissipates with time. Culture in or residence time within the EBR system also increases microbial cell health or robustness which adds to a cell's ability to utilize directly supplied electrons. There are likely multiple factors controlling the optimization of the ability of various microbes to utilize directly supplied electrons. This can be seen in experiments examining denitrification with and without addition of directly supplied electrons under conditions of limiting nutrients and/or electrons.

Figure 7:
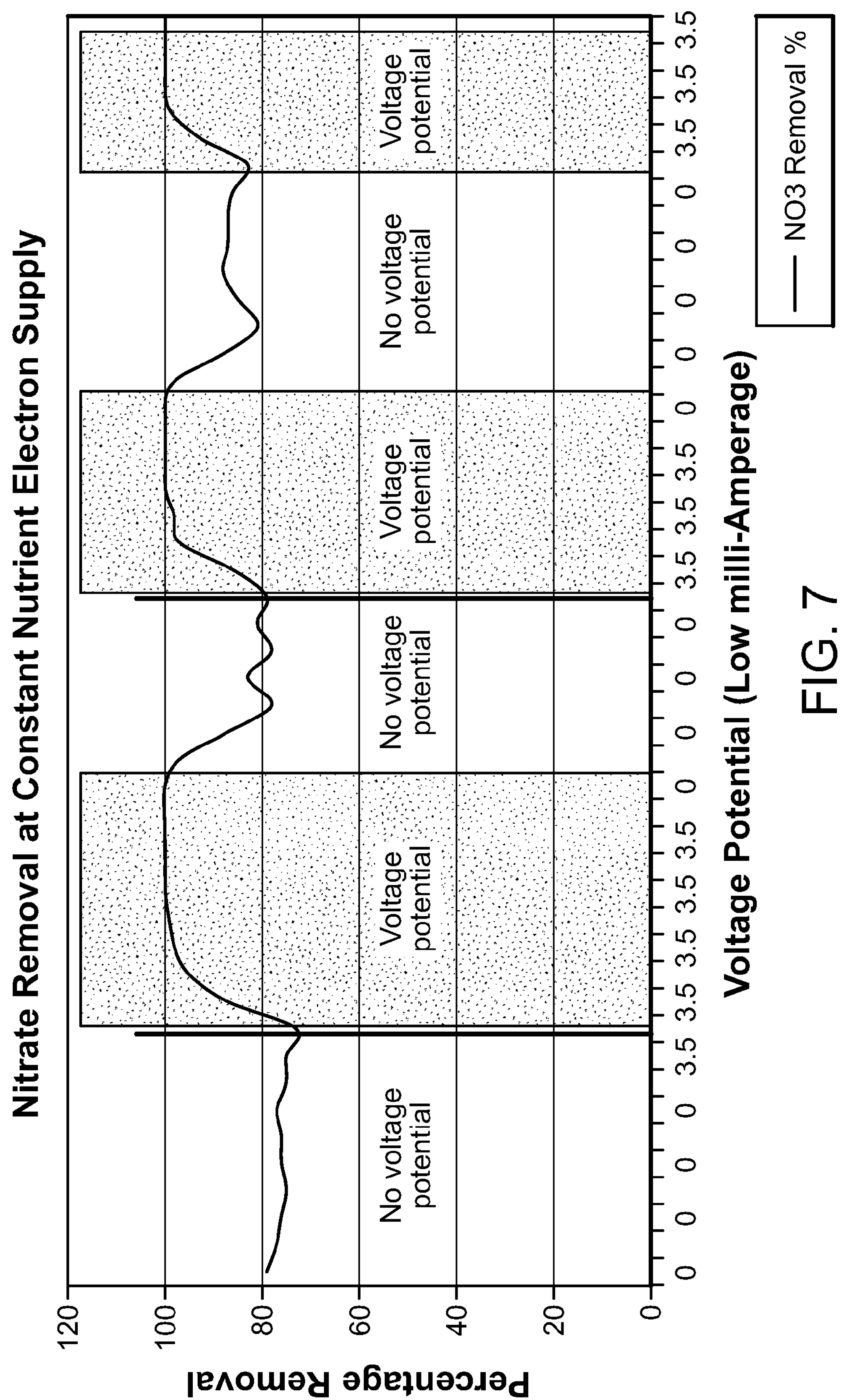
FIG. 7 is a graph depicting denitrification times in nutrient limited systems at constant nutrient electron supply.

With reference now to FIG. 7, denitrification times in nutrient limited systems approach maximum levels more quickly as the addition of directly supplied electrons is repeated. Also, the cells continue to express higher levels of denitrification for a brief period following removal of the directly supplied electrons and grew more rapidly in cell culture than control cell populations without exposure to directly supplied electrons. Note that the performance of the microbial population increased with each cycle and was significantly increased over the testing period.

Figure 8:
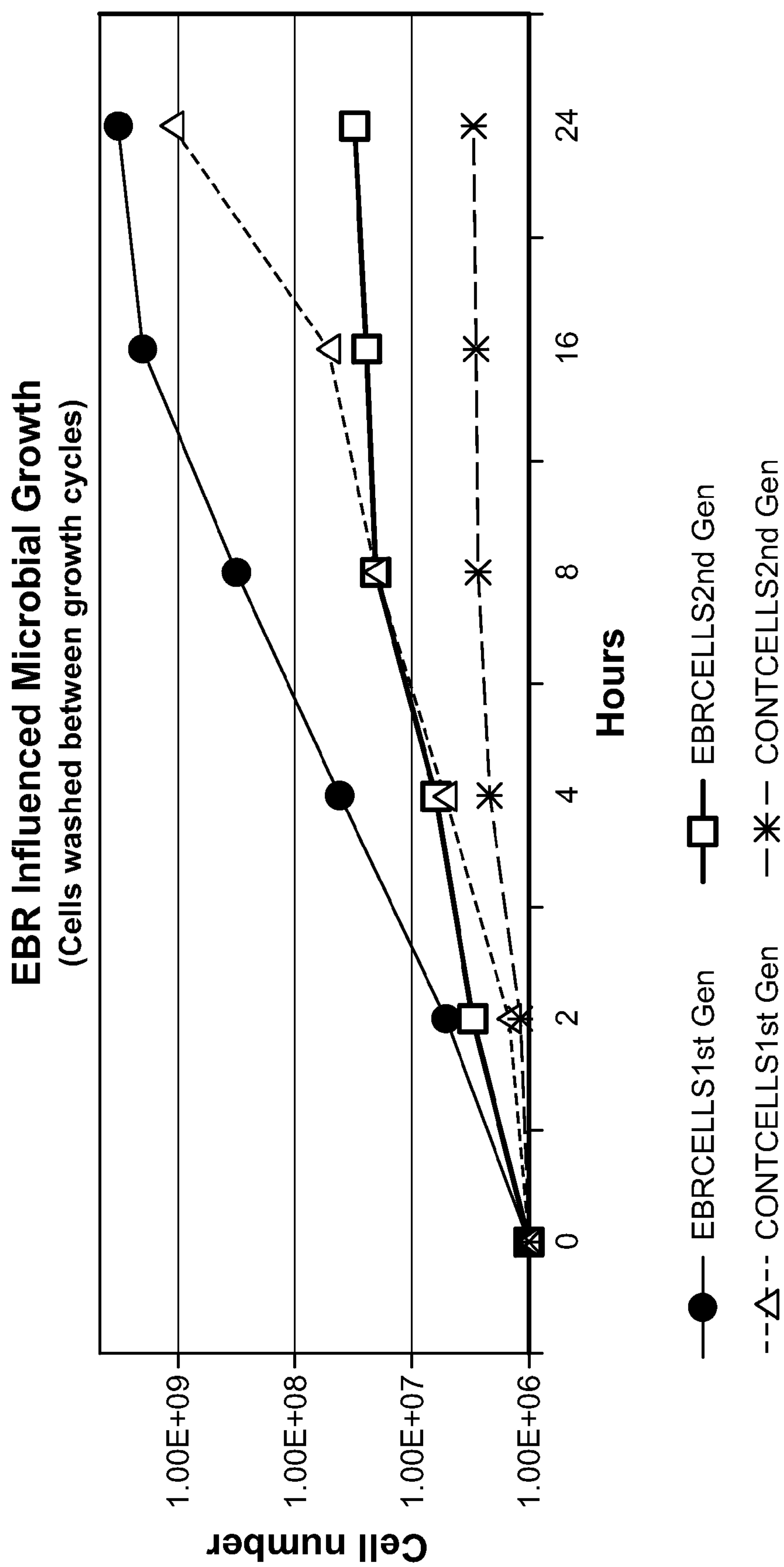
FIG. 8 is a graph depicting the difference in robustness of microbes grown in an electrobiochemical reactor environment of the present invention as compared to microbes grown only in a molasses-based nutrient.

FIG. 8 shows the difference in robustness of microbes grown in the EBR environment using 3 volts potential and nutrients (EBRCELLS1 st Gen and EBRCELLS2nd Gen) compared to microbes grown in just nutrient (CONTCELLS1 st Gen and CONTCELLS2nd Gen). The major difference observed was faster growth and larger number of cells in both 1st and 2nd generation growth experiments. 2nd generation cells were taken from the 1st generation of cells, washed twice with sterile saline and re-grown in sterile saline. The 2nd generation EBR cells retained more residual energy for growth than did the cells only grown in media. FIG. 8 indicates better cell health (energy levels) and overlapping benefits of directly supplied electrons and cell expression of various electron utilization systems and enhanced cell robustness when provided directly supplied electrons in the form of an electron field or gradient.

In conventional biological transformation reactions treatment systems, to remove metals and inorganics, the electrons required for anaerobic microbial respiration are provided from an electron donor (typically an organic compound like glucose, acetate, etc.). Microbes present in the system must metabolize the provided chemical electron donor, with a metabolic energy expenditure, in order to free the electrons for a smaller net energy gain that can be used in their transformation of reactants.

The invention applies low voltage potential (usually 1-5 Volts) with low current (0.01-3 Amps) across a engineered environment or bioreactor using various electrode placements to directly provide the microbes/enzymes with freely available electrons needed for the desired transformations. The voltage (electron energy) and the amperage (number of electrons supplied) depend on factors mentioned above, including for example, electrode separation distances, water chemistry, species and numbers of microbes present (size of the treatment environment and known concentrations of electron acceptors in the water). This would include the total concentrations of contaminants and co-contaminants and their concentrations in the water or the total number of ions to be altered, oxidized or reduced, and the number and species of microbes present. Among the preferred electrode materials are included titanium, various coated titanium (more resistant), various steels, graphite and graphite composites.

In general, in the method of the present invention, the ORP is adjusted through estimation of electron and energy requirements for total major water chemistry reactants below a designated ORP and electron requirements for specific target reactants (contaminants). The designated ORP and electron requirements is then related to a known energy requirement for a particular contaminant or set of contaminant ½ reaction(s) or biotransformation(s).

A native microbial population and or supplemented native microbial populations are selected based on their contaminant biotransformation capabilities and used in EBR systems with lower nutrient levels and provided free electrons that cause them to express more electron transport capabilities (higher surface cytochrome levels and other attributes that are microbe specific, such as higher numbers of pilli, nanowires, and other electron transport structures). This is followed by series of microbial screening protocols that adapt the relative numbers and types of microbes present in the EBR system under EBR conditions or EBR operation that assures that the microbes have optimized their access to the 'free' electrons.

Figure 9:
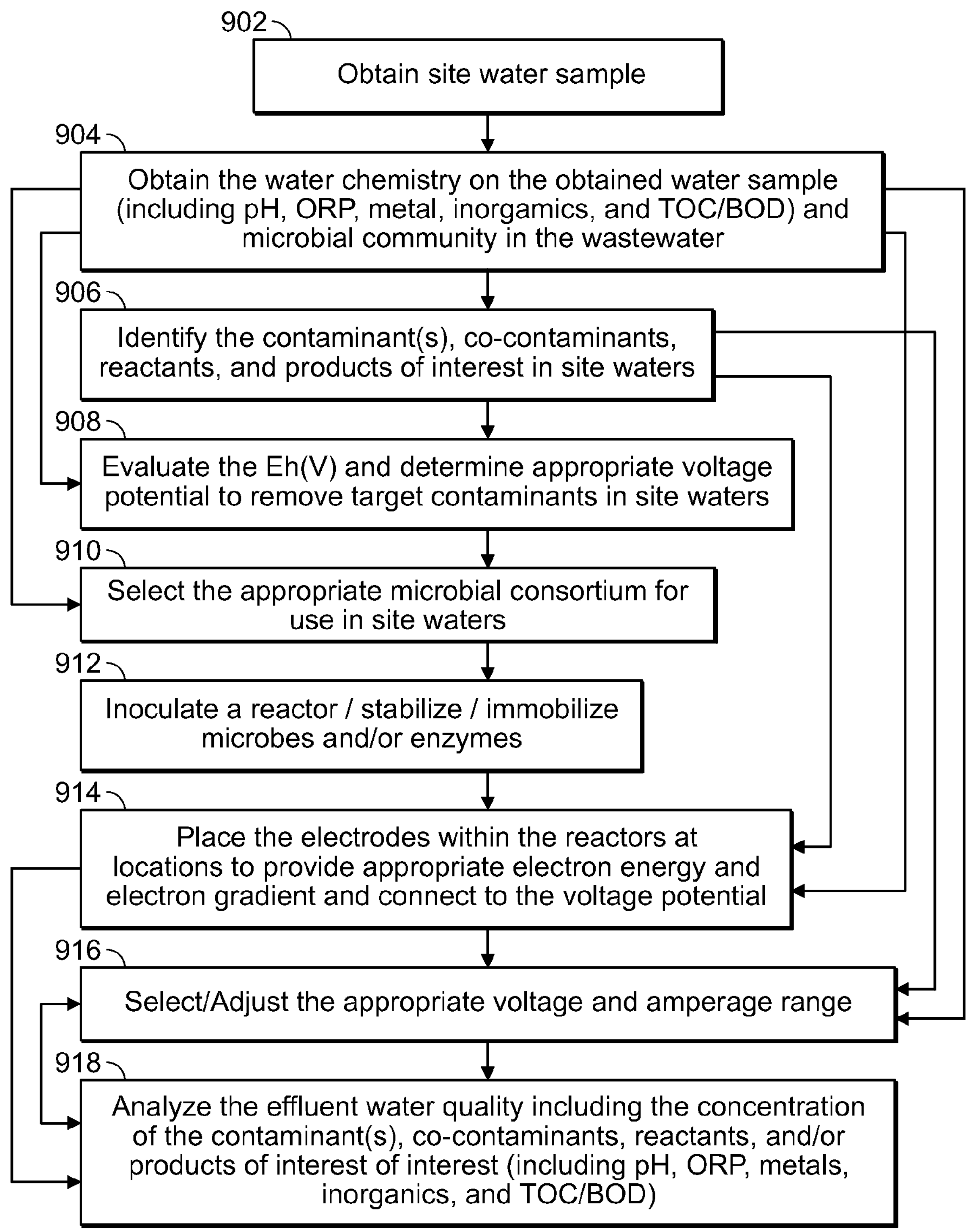
FIG. 9 is a flow chart depicting the general steps taken in accordance with the present invention.

With reference now to FIG. 9, the general steps taken in accordance with the present invention are illustrated. The water or other liquid sample is obtained from the site for analysis (902). For example, one or two liters of a contaminated water sample is collected on site into new glass or plastic containers. Preferably, the containers are rinsed three times with the contaminated water sample.

The next step is to obtain the water chemistry on the obtained water sample (including pH, ORP, metals, inorganics, and TOC/BOD) and microbial community in the wastewater (904). The liquid sample may be split so that the sample may be analyzed for pH, ORP, metals, inorganics, TOC, COD, and BOD and any other analytes and/or ions of interest. The native microbial population will be selected and screened for transformation of the target compound contaminant, co-contaminants, reactants, and/or products of interest.

The next steps is to identify the contaminant(s), co-contaminants, reactants, and products of interest in site waters (906).

Based on the obtained water chemistry, site water discharge limits, the contaminant(s), co-contaminants, reactants, and/or products of interest are identified. For an anaerobic electro-biochemical reactor (EBR) water treatment process, the contaminants of interest might include metals (e.g., selenium, arsenic, mercury, zinc, lead, copper, antimony, cadmium, chromium, cobalt, iron, molybdenum, nickel, silver, thallium, uranium, etc.) and/or inorganics (e.g., nitrate, nitrite, sulfate, perchlorate, chlorate, cyanide, etc.) and specific products of interest might include reduction and/or oxidation products, or other products that might need electrons, electron acceptors, and/or hydrogen ions.

The next step is to evaluate water constituent Eh(V) and determine appropriate voltage potential to remove target contaminants in site waters and evaluate site water chemistry constituents (908).

Figure 10:
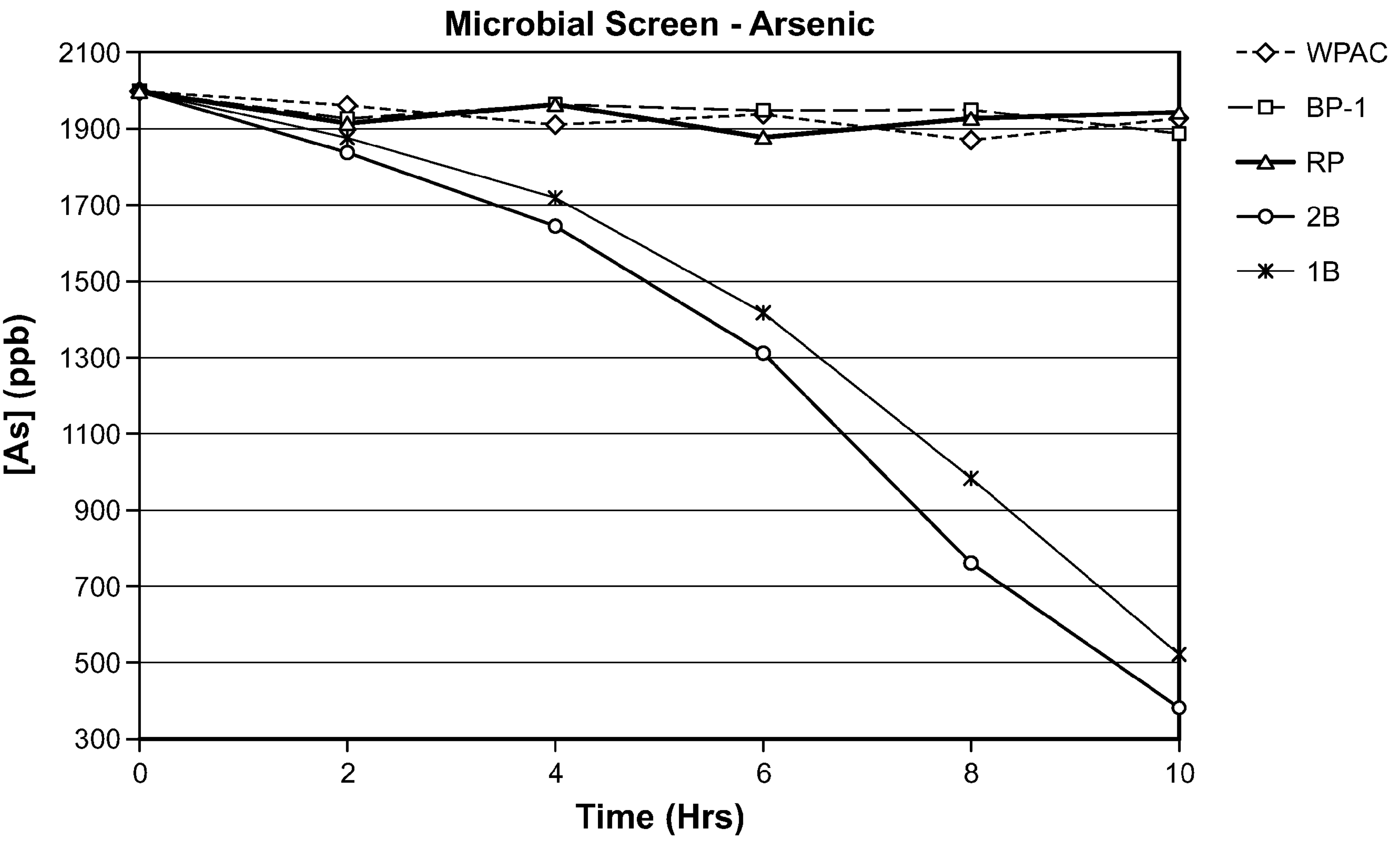
FIG. 10 is a graph depicting arsenic removal from a specific contaminated water using different microbes.

The next step is to select the appropriate microbial and/or enzyme consortium for use in the site waters or to treat the water or other liquid (910). Based on the obtained water chemistry and identified contaminants, reactants or products of interest, an appropriate microorganism or microbial consortium and/or enzyme combination is selected. As an example, FIG. 10 shows the ability of five microbes to remove arsenic from a specific contaminated water. If arsenic is the contaminant of interest in this water chemistry, only microbial consortium named "1B" and "2B" would be appropriate to use based on this screening test.

Figure 11:
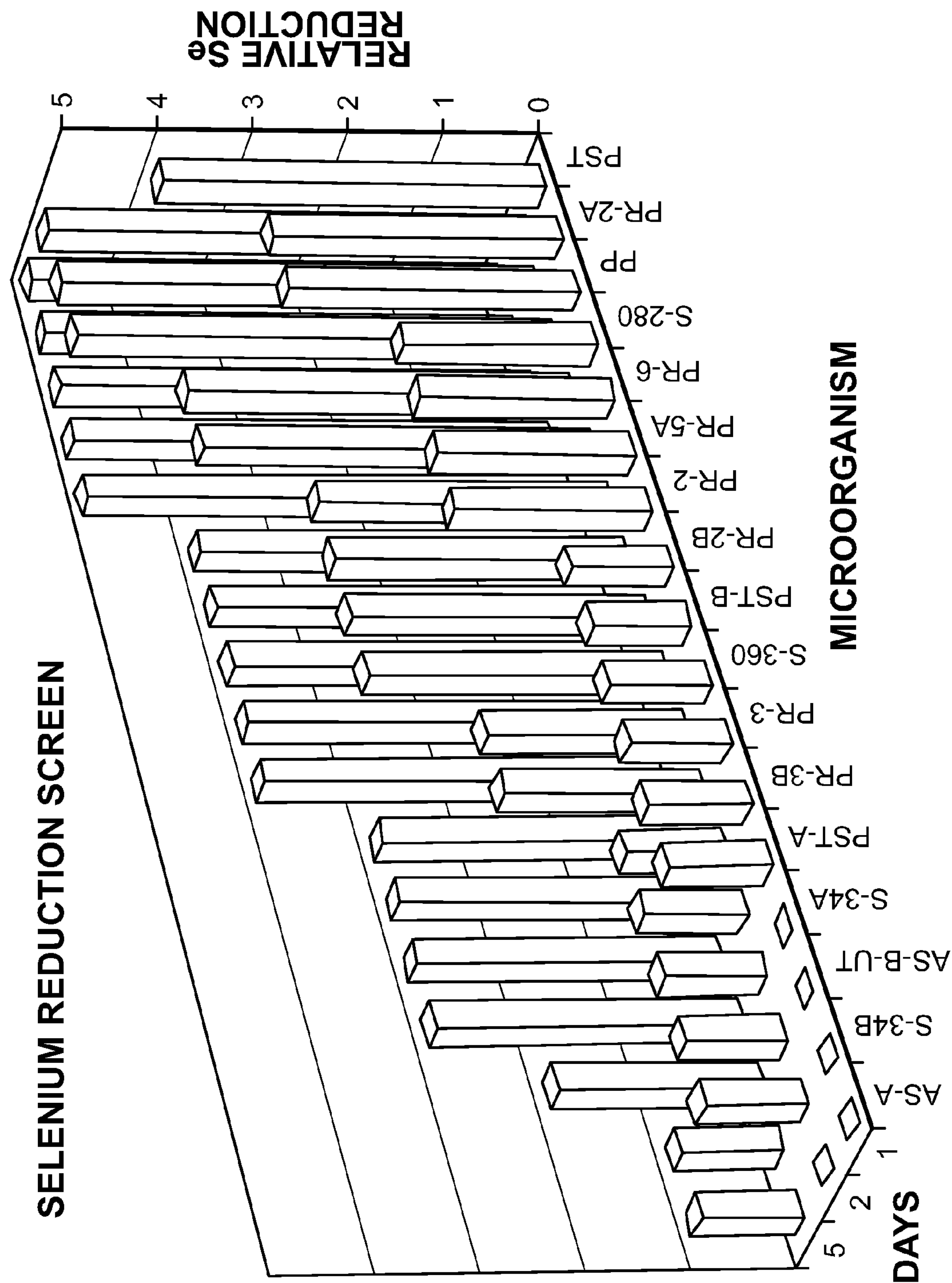
FIG. 11 is a graph depicting a selenium reduction screen using a specific mine water and various microorganism species.

If a different water chemistry and/or different contaminant, co-contaminants, reactants and/or products of interest were involved, as an example, FIG. 11 shows a more in-depth screening for selenium reduction potential as the microbes in FIG. 10 may not be appropriate for a different water chemistry, and/or native microbial compatibility, and a different microbial consortium would be screened and selected. More specifically, selenium reduction screening in the specific mine water showing the selenium reducing capabilities of various microorganism species and populations chosen for selenium reduction screening in that specific water chemistry is illustrated in FIG. 11. Most noteworthy are the microbes indicated as PST, PST-A, and PST-B. These were all identified by nucleic acid 16S ribosomal analysis as the same as *pseudomonas stutzeri* microbe, but all perform significantly different for selenium reduction in different waters—they have a different genetic compliment that can be activated with need or exposure to the environmental conditions present. In the water chemistry screened, the PST microbe/microbial consortium performs much better than the others for this water chemistry and would be selected for inclusion in the treatment of the water, such as biofilm screening and development for this specific water chemistry. However, a different microbe or microbial consortium may or may not be selected for a different water chemistry and microbial content. Thus, similar screenings are completed for each constituent and water chemistry. If a different contaminant, set of reactants, or products were desired, a different microbial consortium would generally be selected.

Figure 12:
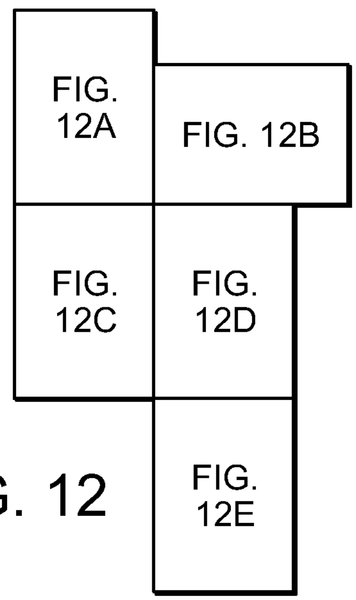
FIGS. 12A-12E are flowcharts depicting the steps taken in accordance with the analysis of the liquid and selection of microbes, in accordance with the present invention.
Figure 12A:
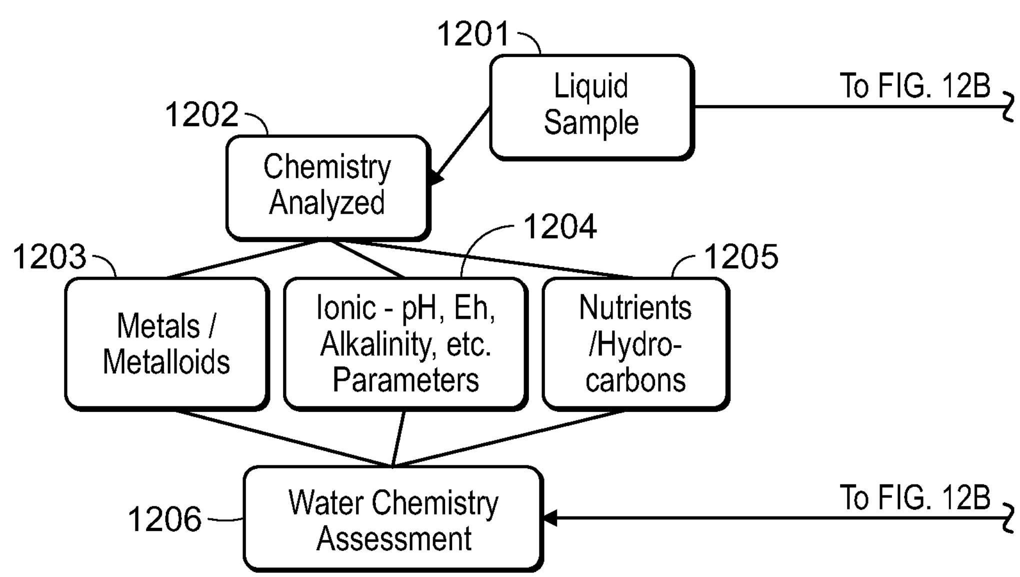
Figure 12B:
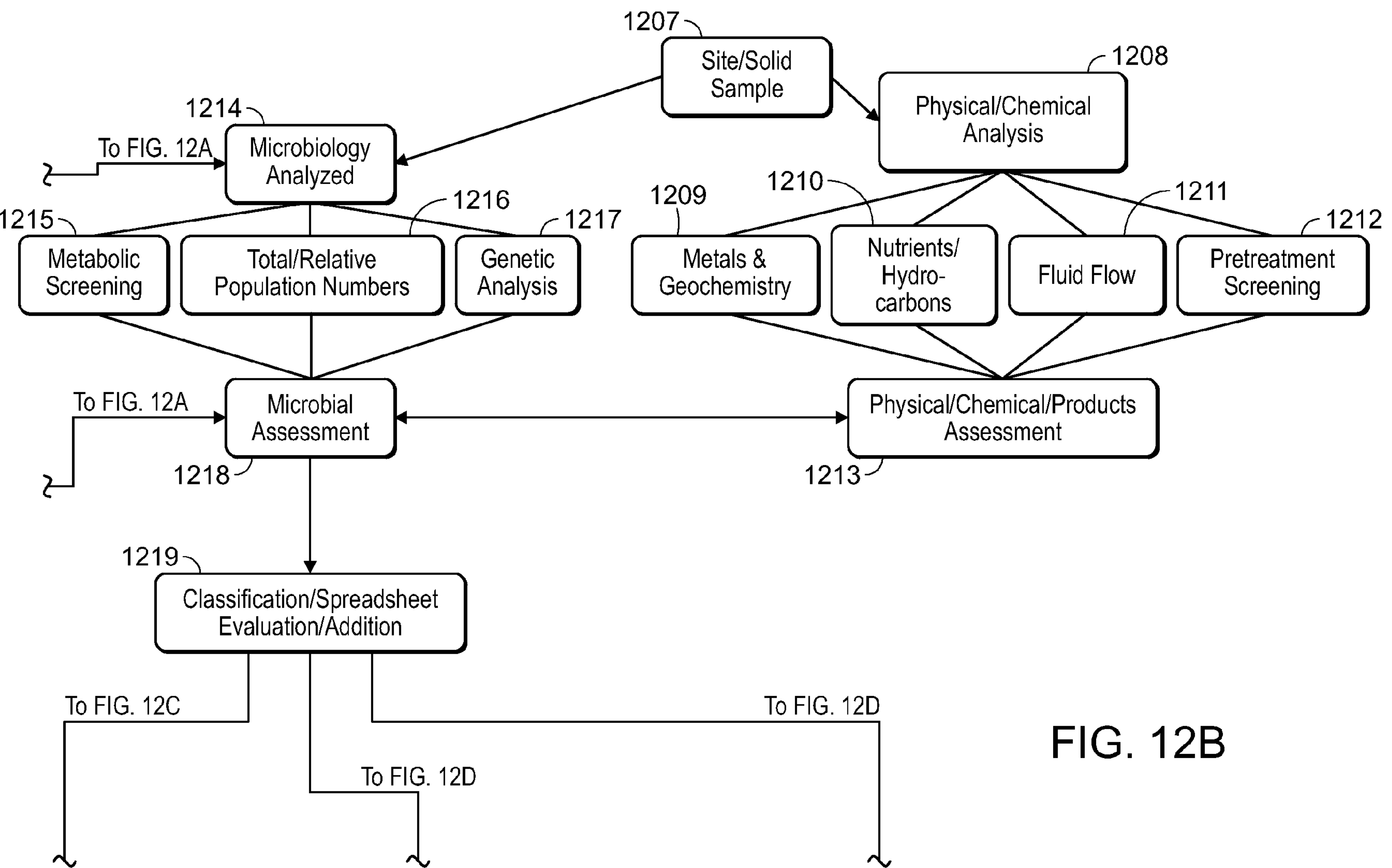

With reference now to FIGS. 12A-12E, methods for the physical and chemical screening and conditioning of microorganisms to develop a microbial bioprocess for a specific water chemistry and its seasonal or process variations are shown. With reference to FIG. 12A, for a liquid sample (1201) the chemistry of the liquid is analyzed (1202), including an analysis to determine metals and metalloids in the liquid (1203), and ionic parameters, including pH, Eh, alkalinity, and the like (1204), as well as determining the nutrients and hydrocarbons within the liquid (1205). This results in a water chemistry assessment (1206).

In the case when the site yields a solid sample (1207), such as when treating water or other liquid passing through solid material, such as earth or the like, a physical/chemical analysis (1208) is performed. This includes determining the metals and geochemistry of the sample (1209), the nutrients and hydrocarbons within the sample (1210), the fluid flow through the material (1211) as well as conducting a pretreatment screening (1212). This yields a physical/chemical/products assessment (1213) of the solid sample from the site.

Regardless of whether the sample is a liquid sample or a solid sample, the microbiology of the sample is analyzed (1214). This includes conducting a metabolic screening (1215 of the sample), and determining the total or relative population numbers of the microbes therein (1216). A genetic analysis (1217) may also be conducted. The foregoing yield a microbial assessment (1218) which results in a classification of the microbes and the spreadsheet evaluation of the microbes and determination of any additional aspects of the microbe, water chemistry, etc.

Figure 12C:
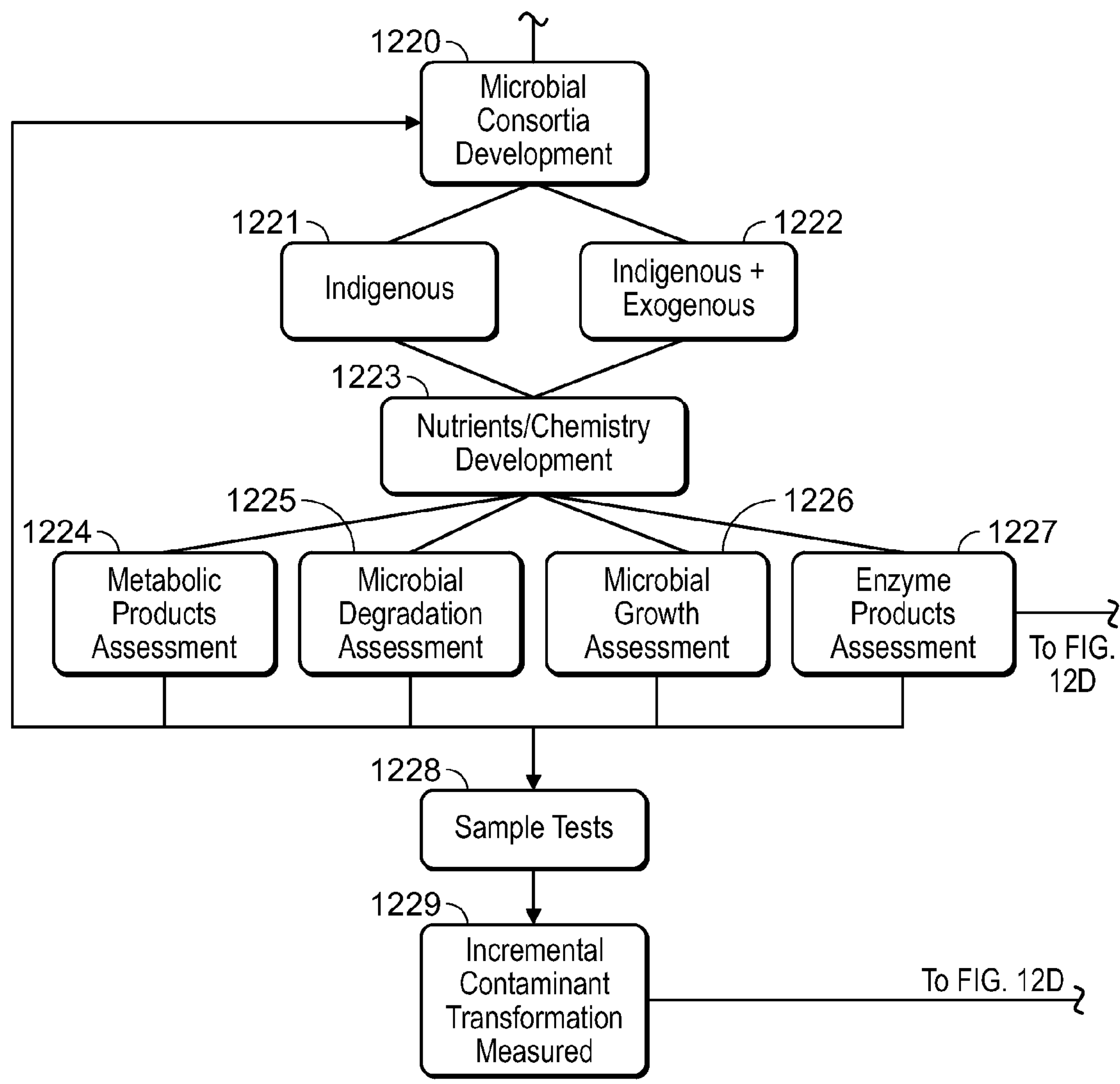
Figure 12D:
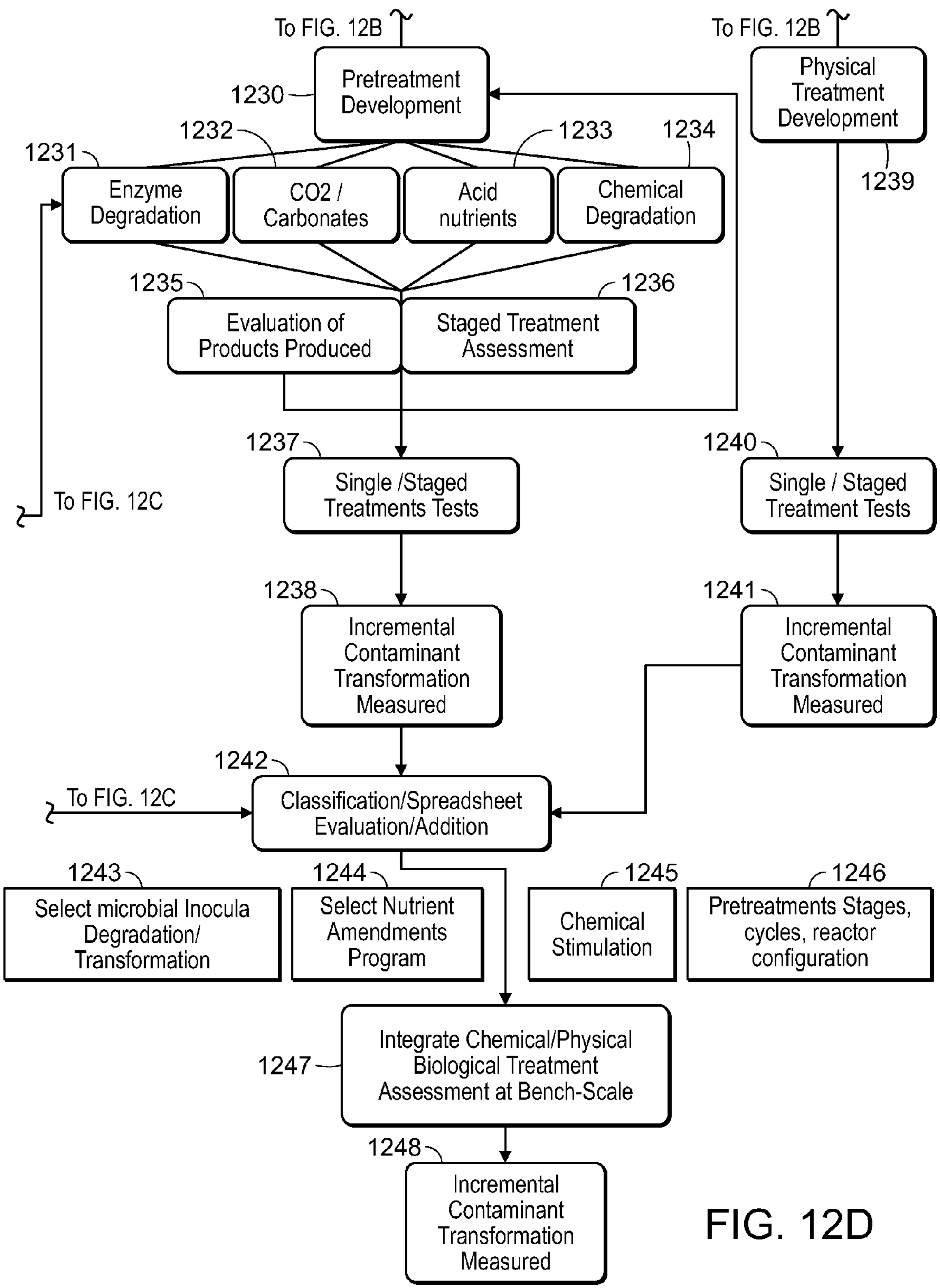

With reference now to FIGS. 12C and 12D, based upon the foregoing evaluation and analysis, a microorganism and/or enzyme development plan is created. This includes the development of a consortia of microorganisms (1220), including a determination of the indigenous microorganisms (1221) and a determination if a combination of the indigenous microorganisms as well as additional or exogenous microorganisms (1222) are needed. The nutrients and chemistry for the development of the microorganisms is determined (1223). Assessments are made of the metabolic products (1224), microbial degradation (1225), microbial growth (1226) and enzyme products (1227) is made. Sample tests are performed (1228) and incremental contaminant transformation is measured (1229).

Pretreatment development (1230) includes a determination or analysis of enzyme degradation (1231), $CO_2$ carbonates (1232), acid nutrients (1233) and chemical degradation (1234). The products produced are evaluated (1235) and a stage treatment is assessed (1236). This includes performing single or staged treatment tests (1237) so as to measure incremental contaminant transformation (1238).

A physical treatment plan may also be developed (1239), which involves single or staged treatment tests (1240) so as to measure incremental contaminant transformation (1241). The results of these measurements, evaluations and developments may modify or create a new classification/spreadsheet and a different evaluation and/or consideration of addition of other microorganisms and/or enzymes (1242). This may include selecting microbial inocula to determine degradation and transformation of the target compounds (1243), selecting and determining a nutrient amendments program (1244), chemical stimulation of the microorganisms, and configuration of pretreatment stages, cycles and reactor configuration (1246). The chemical/physical biological treatment assessment is integrated at bench-scale (1247) and incremental contaminant transformation measured (1248).

Figure 12E:
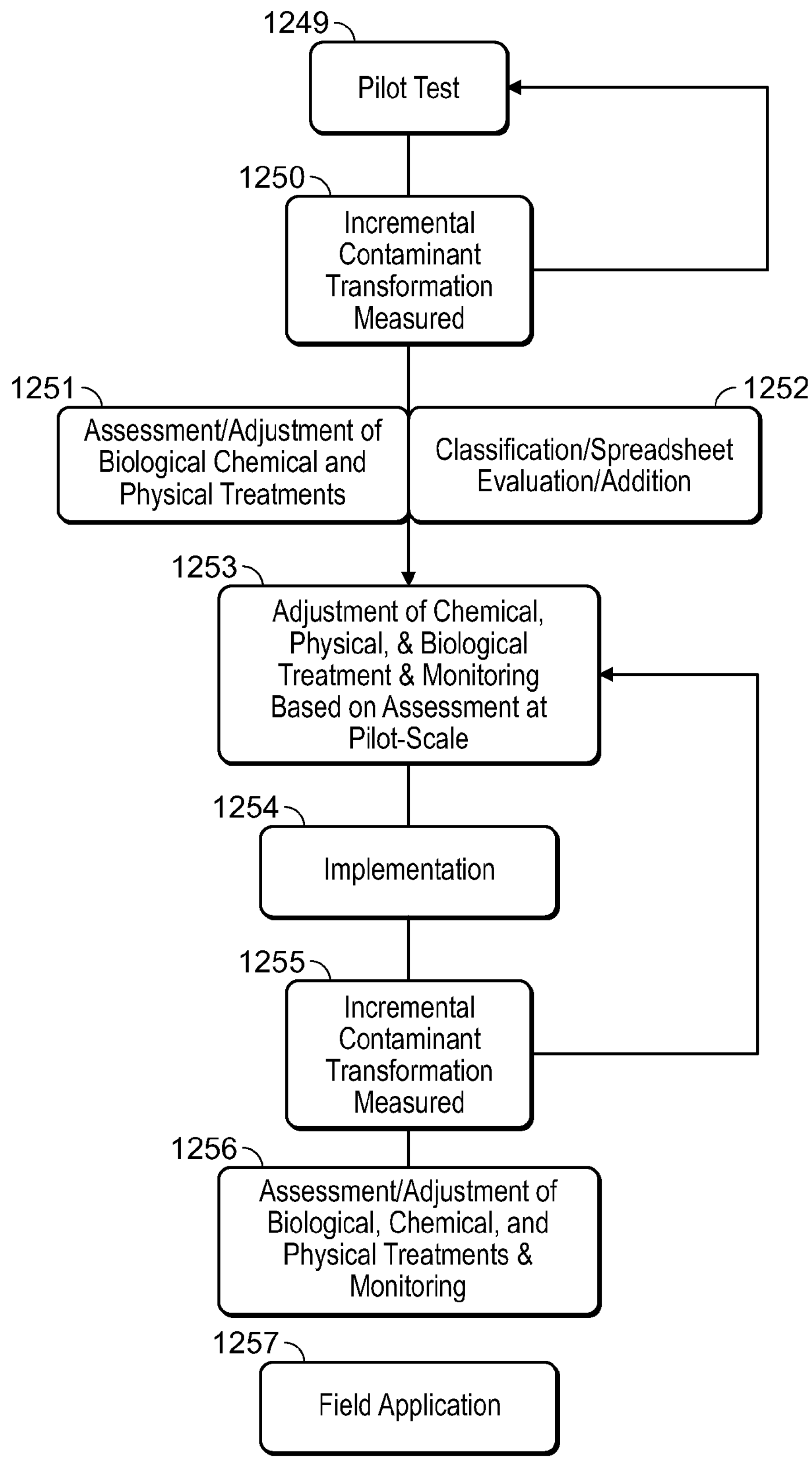

With reference now to FIG. 12E, this process advances to a pilot test (1249) wherein incremental contaminant transformation is measured (1250). This includes an assessment and adjustment of biological, chemical and physical treatments (1251) and classification, spreadsheet evaluation and addition (1252) revisions as necessary. Adjustment of chemical, physical and biological treatment and monitoring is performed based on assessment of the pilot-scale (1253). This results in an implementation (1254) and the incremental contaminant transformation is measured (1255). Once again, assessments and adjustments of the biological, chemical and physical treatment is made and monitored (1256), finally resulting in a field application (1257).

Referring again to FIG. 9, based on selected microbe/microbial consortium and/or enzyme/enzyme combination, the bioreactor and/or treatment area is inoculated or stabilized (912). Microbes and/or enzymes may be immobilized on support surfaces, other than electrode surfaces, of the bioreactor and/or treatment area. This involves inoculating or immobilizing selected microbes, microbial populations, or microbial biofilm or enzyme components on various surfaces and/or reactor fill or support materials using conventional microbial and immobilization techniques, such as on activated carbon, sand, pumice, membranes and the like.

Support surfaces or all material surfaces that have been placed within, or are within, the bioreactor for the specific purpose of supporting the attached microorganisms, enzymes, biofilms, etc. These surfaces may be activated for the purpose of achieving a higher density of microbes/enzymes capable of the transformation of interest. The surfaces can contain materials that provide high surface area and/or can promote the stability of the attached microbial biofilm, protein, enzyme, etc. These materials may include activated carbon, gravel, pumice, wood chips, plastics and other materials. The microbe and enzyme support surfaces, for purposes of this invention, are not considered the surfaces of the electrodes, although it is possible that a relatively small population of the microorganisms and/or enzymes could be associated with the surfaces of the electrodes. However, it is intended that the effects of the invention be performed by microorganisms and/or enzymes which are in suspension within the fluid and/or on support surfaces within the bioreactor or treatment area which are separate and spaced apart from the electrodes. The support surfaces are within a treatment area in which an electron field will be generated between electrodes.

For example, in general, the surface area can be created from macro-pores for microbes and micro-pores for enzymes, as well as a determination of the types of functional groups on the surface, in order to create and achieve a high density and/or protection of the microbes/enzymes. Preferred support materials are low cost, high surface area-like activated carbon and pumice type materials. The attachment supporting surface must support the microbial biofilm or attached enzymes in the manner to be exposed to the liquid, typically water, moving through the system. Preferred surfaces will have a large amount of macro- and meso-porosity for microbes and meso- to micro-perosity for enzymes as this protects each optimally while providing the greatest volume of reactive material per surface area. The population of microorganisms are developed and concentrated on the support surfaces where the population of microorganisms (biofilm) is configured to or capable of enhanced performance through acting on, binding and transforming the one or more target compounds. The development and population of the microorganisms and/or enzymes may occur prior to application of electricity to the electrodes or concomitant therewith.

The natural environment contains hundreds to thousands or more of microbial species that can be stimulated when nutrients are applied. As discussed above, the method of the present invention selects the most desirable and compatible microbes; microbes that are compatible with one another and robust within the site water chemistry containing site microbes. That is the one or more that have the genetic complements to perform the desired transformations at the desired rate within the site or environment of water chemistry range and physical conditions and greatly increases their number through classical microbiological techniques. Various permutations of the best microbes needed for the desired transformation are then screened in site waters and conditions and the best combination selected and produced in the best relative proportions for inoculation of the bioreactor and/or selected site environments. These populations may be screened under conditions that stress it with impacts from water chemistry and the native microbial population, containing lower numbers of these microbes, to establish and verify the robustness and increased performance of the selected enhanced microbial population genetic and transformation capabilities over time. Inoculation establishes the desired microbes at the desired population density that is orders of magnitude higher than would be developed naturally. This provides a genetic and microbial complement that retains the desired performance robustness over longer times.

The microbial/enzyme support surfaces can be moderately resistant to plugging, overgrowth, and/or decay. Suitable active surfaces of microbial/enzymes support surfaces and materials can include, but are not limited to, plastics, zeolites, silicates, activated carbons, starches, lignins, celluloses, plant materials, animal materials, biomaterials, and various sizes and combinations thereof along with inert 'spacer' materials to maintain function liquid flows through the system. Support surfaces can have functional groups, which are selected and optimized to bind a high density of a particular microbe or enzyme preparation. For example, and in order of increasing vasicity, hydrogen, carboxyl, lactone, phenol, carbonyl, ether, pyrone, and chromene groups are non-limiting examples of suitable functional groups for support material in accordance with the present invention.

The reactor can be inoculated, wherein a population of microorganisms is developed on the fill materials, in a variety of ways and at different times. At times, it may be necessary or useful to deliberately inoculate the active areas of the support surfaces. At other times, the fluid, such as water to be treated, may have a minor microorganism population associated with the fluid that may, with adequate time and conditions, naturally inoculate the fill materials and develop a biofilm.

A number and variety of microorganisms can be utilized to inoculate the active or accessible portions of surfaces and fill materials, either alone, or in combination. Non-limiting examples of bacteria and algae that may be utilized include Cyanobacteria, Diatoms, *Alcaligenes* sp., *Escherichia* sp., *Pseudomonas* sp., *Desulfovibrio* sp., *Shewanella* sp., *Bacillus* sp., *Thauera* sp., *P. putida, P. stutzeri, P. alcaligenes, P. pseudoalcaligenes, P. diminuta, Xanthomonas* sp. including *X.* (*Pseudomonas*) *maltophilia*, Alc. Denitriβcans, various *Bacillus* species *Bacillus* species that are versatile chemoheterotrophs including *B. subtilis, B. megaterium, B. acidocaldarius*, & *B. cereus, Cellulomonas* and *Cellulomonas Fermentans*, various sulfate reducing bacteria including *Desulfobacter, Desulfobulbus, Desulfomonas, Desulfosarcina, Desulfotomaculum, Desulfurocococcus, Desulfotomaculum*, and *Desulfuromonas* species, *Nitrosomonas, Nitrobacter, Rhodobacter, Thiobasillus*, and *Geobacter* species, *E. coli*, and various Achaea bacteria and combinations thereof. The premix consortium of identified microbes are grown to high concentration and added to the electrobiochemical reactors (EBR).

With reference again to FIG. 9, electrodes are placed within the reactors at locations to provide appropriate electron energy and electron gradient or field. The electrodes are connected to a voltage potential (914).

The reactor electrode placement is based on the obtained water chemistry, the identified contaminant(s) and contaminant, reactants, or product concentrations and sums of oxidized and reduced water chemistry constituents. The electrodes are placed within the reactor to provide an electron density and energy profile needed to enhance biotransformation of the contaminant(s) and co-contaminants reactants, and/or products of interest. Modeling of electron distribution from electrodes can be applied to the EBR treatment environment with input from bench testing to optimize the performance for each site water.

One milli-ampere of current provides $6.24\times10^{15}$ electrons per second to the EBR system. The distance between the electrodes influences the amount or density of available electrons per unit volume of inoculated microbial and/or enzyme support material as the voltage determines their energy. Milli-amp current is provided to each EBR separately, such as using Agilent Technologies EA3617A power supplies or similar, at 1 to 5 volts potential according to calculations obtained with consideration of the microbial population and numbers to be put in place and the size of the EBR unit.

Microbially and/or enzyme assisted reduction reactions require electrons. Generally, the lower the oxidation-reduction potential (ORP) required for a given reaction to take place, the more electrons (milli-amps) and the higher electron energy (voltage potential) required to assist the microbes and/or enzymes to complete the reaction and form the desired products. For example, complete denitrification requires five electrons, selenate reduction to elemental selenium requires six electrons, while sulfate reduction to hydrogen sulfide gas requires eight electrons (equations 1, 2, and 3).

$$NO_3^- + 5e^- + 6H^+ \rightarrow \frac{1}{2}N_2 + 3H_2O \quad (1)$$

$$SeO_4^{2-} + 6e^- + 8H^+ \rightarrow Se_{(s)} + 4H_2O \quad (2)$$

$$SO_4^{2-} + 8e^- + 10H^+ \rightarrow H_2S + 4H_2O \quad (3)$$

The production of hydrogen sulfide gas in the macro environment (the entire bioreactor environment) is much more energy intensive than the $H_2S$ production in the microenvironment, which happens in all bioreactors, including the EBR.

Figure 13:
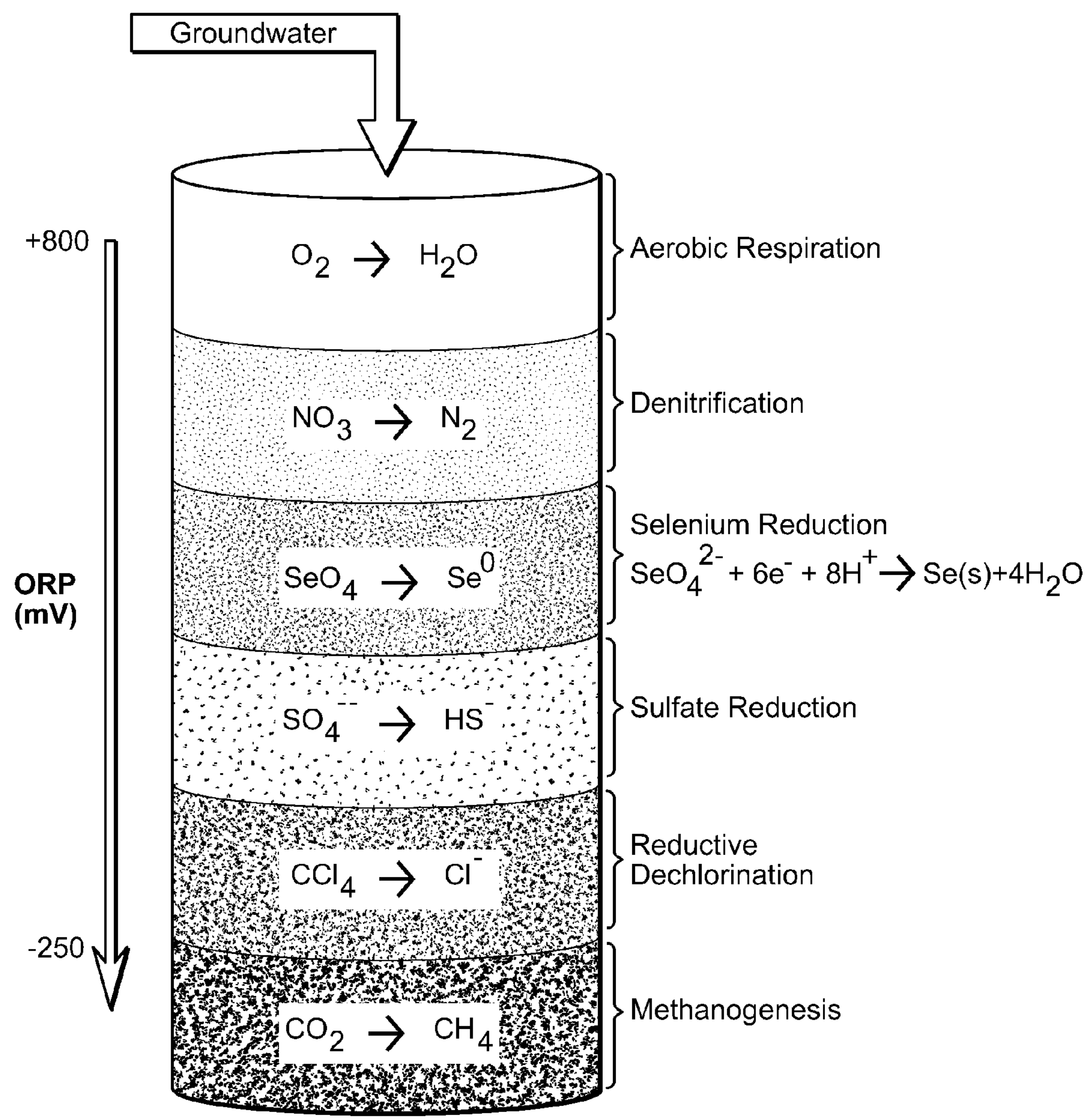
FIG. 13 is a diagram illustrating an ORP ladder with reduction ranges following a reductive sequence, which can be used in accordance with the present invention.

With reference now to FIG. 13, reduction Eh(mV) ranges follow a reductive sequence termed an ORP ladder in which contaminants falling within a narrower Eh(V) range are all reduced before the next most energy providing reactants are started to be reduced. The nature of equilibrium reactions is this in a range of Eh(V).

The electrode placement distance is determined by the volume of water above the EBR distribution system and or the nutrient addition points in the system and the average water flow rate. This is different for all reactor types and configurations, flow rates, type of nutrients or electron donors used, microbes/enzymes and temperature. For example, in some microbial EBRs, electrodes are placed at a distance where the electrons provided by supplemental microbial maintenance nutrient is nearing a 2-4 hour depletion point; this can be calculated for different water chemistries and each reactor size and type. Organic nutrients and electron donors release electrons in a stepwise manner based on microbial metabolic rates and for enzymes, based on electron carrier and enzyme concentrations. For enzymes this is calculated based upon the concentration of electron donor and looking for a similar electron availability depression point.

Examples of electrode placements are shown in FIGS. 14A-14F. Example electrode placements include two horizontal electrodes, each placed within 5%-35% from the top and bottom of the reactor. As an example, such a configuration could be applied to assist the removal of low to high levels of nitrate-N and nitrite-N from water (0.5-1,200 mg/L $NO_3$—N) or low to high levels of selenium (0.01-15+ mg/L Se) from waters with low to moderate ORP potential (−200 mV to +200 mV).

Figure 14A:
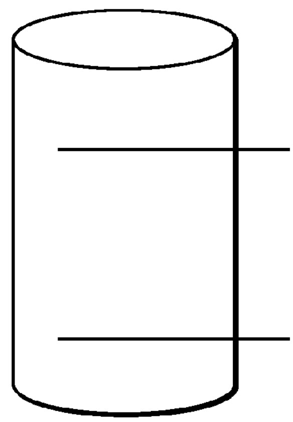
FIGS. 14A-14F are diagrams depicting side and top views of various electrode placements, in accordance with the present invention.
Figure 14B:
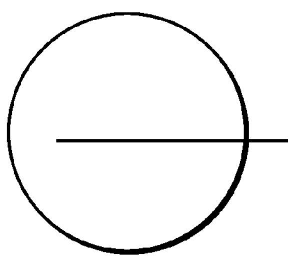
Figure 14C:
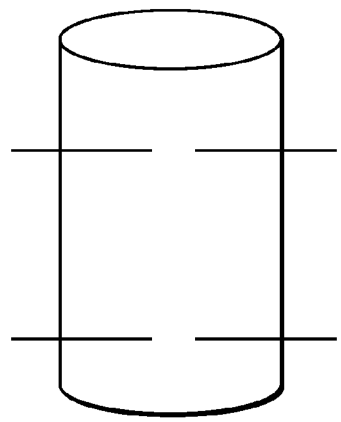
Figure 14D:
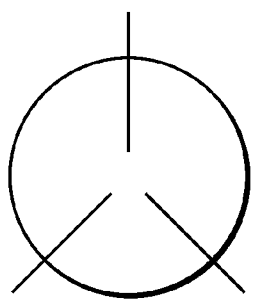

Configuration FIG. 14A can be used in smaller applications; i.e., reactor volumes of 10 mL to 500 gal. For large applications (i.e., above 300 gal), the same can be achieved by placing multiple electrodes around the tank, with the bottom and top electrodes placed within 5%-35% to the bottom and top of the tank, FIG. 14C. Additionally, the electrode placement shown in FIGS. 14A and 14C form an electron gradient that can remove multiple contaminants within a single reactor volume.

Figure 14E:
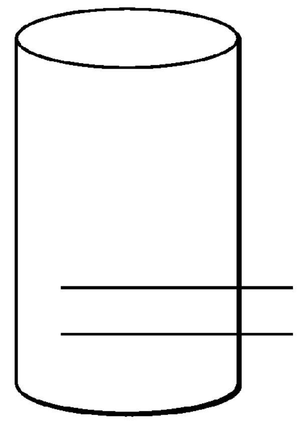
Figure 14F:
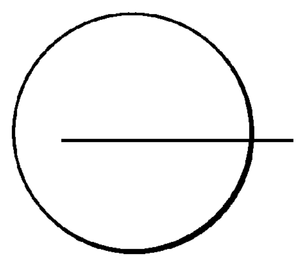

As another example of an electrode placement or configuration, which can be applied to targeting specific contaminants, co-contaminants, reactants, and/or products of interest within the same reactor. This configuration uses several sets of anode couples (FIG. 14E). Such an electrode placement can create multiple reduction zones within the same reactor. As an example, such a configuration can be applied to removal of low to high levels of nitrate-N and low to high levels of selenium or sulfate from waters with low to moderate ORP potential. It can also be used for removal of one contaminant or more specific contaminants, co-contaminants, reactants, products from waters with high ORP potential (above +200 mV).

The electrodes provide the electron field that distributes electrons at selected densities through the bioreactor system. As mentioned this is adapted from developed models and in tests conducted/adjusted in bench scale tests with site water chemistries. FIG. 14 shows just an example of a few of the different electrode configurations. In each case, the electron density is modeled and the spacing between pairs of anodes adjusted to generate the density of electrons needed. For example, in high nitrate concentration waters a multi-faceted electrode configuration would be used; three or more anodes at one or multiple locations that are tested at bench scale to demonstrate adequate denitrification. For a series of contaminants having a large number of reactive compounds within a similar Eh(V) range a configuration like 14E or a combination of 14C and 14E would be used. Modeling combined with bench-scale test of the electrode configuration and adjustment based on bench-scale test has shown to be the best method to provide the correct number and spacing of the electrodes; this is completed with a consistent EBR support surface; like activated carbon. The preferred density of the electron is calculated from the concentration of the major different water chemistry components and then a combination of electrode configurations and adjusted milli-amps provide the calculated electron density through the system.

Voltage across resistance causes current (amps or electrons/second). Voltage divided by resistance equals current (amps or number of electrons per second). Make the voltage twice as large, then the charges flow faster, and you get twice as much current (electrons). Make the voltage less, and the current (electrons) becomes less.

Electrodes have a very small and insignificant surface area for reactant transformation, almost zero compared to the total treatment area in an EBR having a high surface area material like activated carbon and high surface area pumice materials; the electrode surface area is over a billion times smaller in even a small EBR. For example an average gram of activated carbon has a surface area of greater than 500 $m^2$; even a small EBR system would contain tens of tons of activated carbon and every ton is 1 million grams each with a surface area of 500 $m^2$. The flow of liquids through the poor spaces and over the surfaces of the microbial/enzyme support surface areas provides additional contact and reaction time for the transformations the EBR system was designed to enhance.

The electrodes provide electrons throughout the high surface area, active or available surface area materials which provide electrons throughout the bioreactor's active portions of the surface area and to the microorganisms performing the desired transformations using the directly supplied electrons. In large bioreactors the support surfaces are packed based on the size of the material. Since the EBRs for metal removal are plug flow reactors, this maintains the metal precipitates within the EBRs until back flushing is used to remove a metal precipitate concentrate. The support surfaces in metal precipitation EBRs are of larger materials of about 0.5" to 1.0" in diameter. For denitrification cyanide destruction in the absence of metals, the microbial/enzyme support surfaces would be either suspended microbes or small materials to carry a higher concentration of suspended microbes, usually less than 0.125" in diam. Suspension cultures are used whenever the reactants do not react to form precipitates as they can achieve greater reaction kinetics; the EBR technology can be applied to all reactor types commonly used. The type of reactor system used follows conventional engineering guidelines/criteria for bioreactor type selection and may be applied in modular systems of appropriate design size for the use intended and space available. The support surface area materials (EBR fill materials) are placed within a flow of the liquid and both the electrodes and the high surface area surfaces are not required to be capable of supporting an electrical charge, this mediated by the liquid and/or biological growth. Because the high active or available surface area materials have many orders of magnitude more surface area than the electrodes, they are the focus for microbial growth and the prime target for electron distribution to the microbial biofilm.

A method for removing a target compound from a liquid can include arranging two or more electrodes so as to be separated by a predetermined distance. The number and placement of electrodes (arrangement and distance separation) is dependent on the ionic strength of the solution being treated and the main Oc and Rc constituents. As discussed above, different water chemistry constituents require different electron energies. For example sulfate bioreduction requires more energy than does denitrification and the microbes get less of the energy, therefore the 'free' electrons in the system and their energy level become important in a bioreactor system to target sulfate or other ions in a similar Eh(V) range. On the other hand, a high concentration of nitrate in the system required a denser electron gradient to provide excess electrons to be able to reduce other co-contaminants like arsenic, selenium, and mercury.

The selection of the microorganisms and/or enzymes dictate the determination of nutrients, needs, and to a certain extent the potential difference applied between the electrodes and through the microbial/enzyme support surface materials. Potential difference, as referred to herein, is the difference in the electron energy (voltage use) or number of electrons (amperage) between the system anode(s) and cathode(s). The potential difference creates a free electron field, providing the microorganisms with free energy, electrons, energy available without microbial metabolic energy expenditure, that can be sufficient in combination with microbial action to remove, cause or provide the electrons needed for microbially-mediated transformation of the target compound from the liquid and maintain the population of microorganisms. The combination of amperage and voltage used and provided can also increase microbial transformation rates of the target compounds and the number of compounds transformed. In a system with many compounds (ions), all ions below the targeted compound (ion) energy level in the solution will be available for potential microbial transformation using the provided electrons. Thus, it is important to determine the water chemistry to know the amount of electrons that will be needed to permit microbial transformation of the target compound.

With reference again to FIG. 9, the appropriate voltage and amperage range is selected, and adjusted (916).

Based on the obtained water chemistry, identified contaminant(s), co-contaminants, reactants, and/or products of interest, and chosen electrode placement, the appropriate voltage potential is selected. The voltage potential can be adjusted based on the effluent water quality results (918). Voltage potential is important as it defines the energy of the provided electrons.

Example voltage selection, depending on the electrode spacing, to reduce low to high concentrations of contaminant(s), co-contaminants, reactants, and/or products of interest include:

- 0.01 V-2.0 V for reduction of nitrate-N from waters with low to moderate ORP potential,
- 0.1 V-3.5 V for removal of metal oxyanions (such as selenate and arsenate) from waters with low to moderate ORP potential,
- 1 V-5V for sulfate reduction in waters with low to moderate ORP potential, and
- During reduction of oxyions, the oxidation of other contaminant(s), co-contaminants, reactants, and/or products of interest such as cyanide and ammonia can also be achieved.

Figure 15:
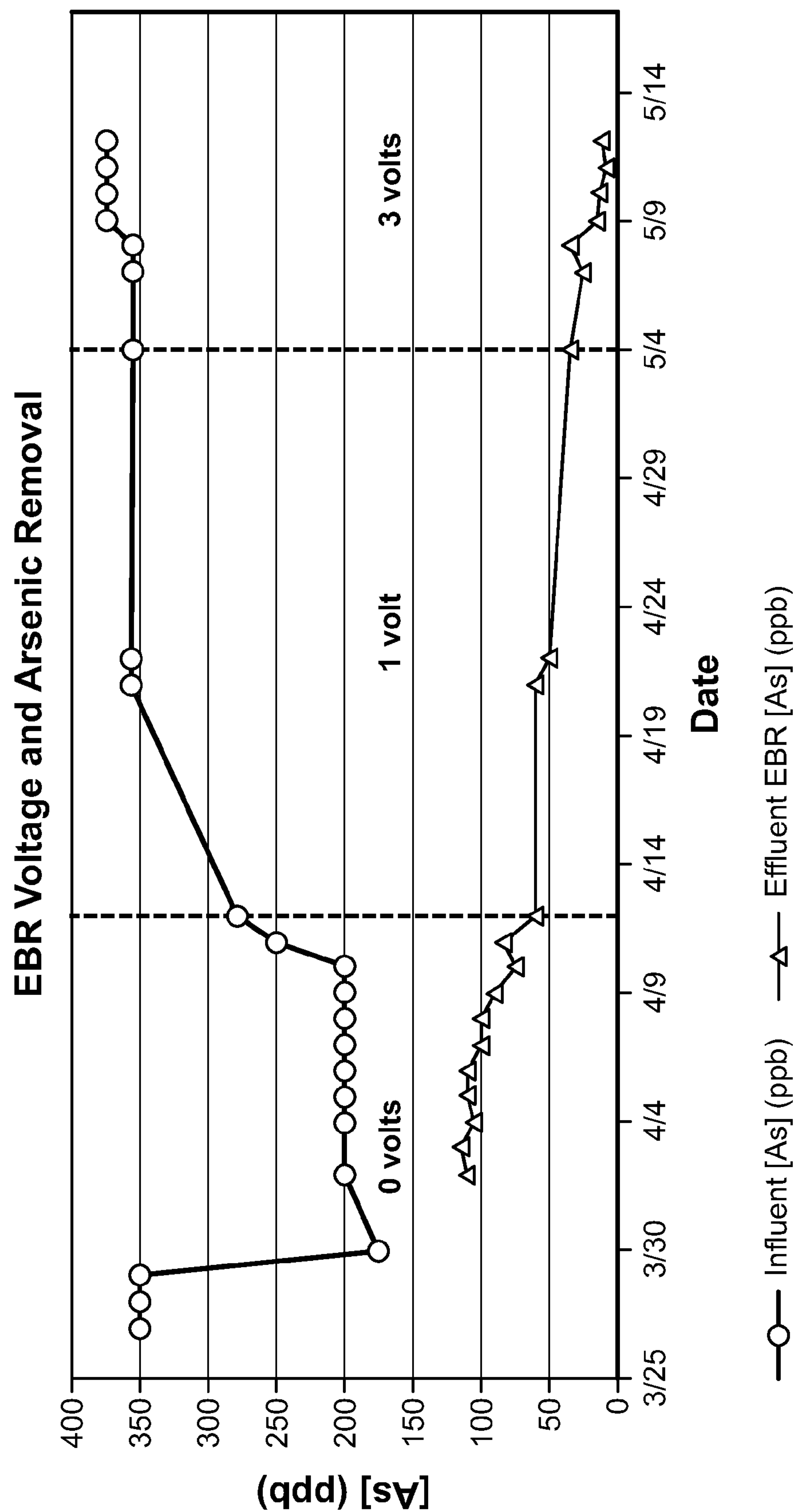
FIG. 15 is a graph depicting arsenic removal at various voltage potentials in accordance with the present invention.

The effluent water quality is analyzed including a concentration of the contaminants, co-contaminants, reactants, and/or products of interest, as well as pH, ORP, metals, inorganics and TOC/BOD (918). This is used as a tool for adjustment of voltage and/or amperage if necessary. For example, as shown in FIG. 15, if the contaminant of interest is arsenic and it is not being removed to desired levels at 1.0 volts in the water chemistry being used, or if the ORP and/or pH changes, the voltage and electron density can be increased, such as by increasing the voltage to 3 volts, to improve the removal of the arsenic.

Additionally, the placement of the electrodes, the adjustment of voltage potential, and the adjustment of amps can be used to help stabilize the ORP within the reactor volume. For example, for the reduction of selenate to elemental selenium, the desired optimal ORP range is between −50 to −200 mV. Electrode placement shown in FIG. 14E can be used to help stabilize the ORP in the reactor volume in high ORP influent waters, electrode placement as shown in FIGS. 14A-14D, as appropriate for reactor size, can be used to assist in stabilization of the ORP in the reactor volume in waters with low to moderate ORP waters.

ORP contaminant(s), co-contaminants, reactants, and/or products of interest monitoring can be used to control, using a feed back control loop to adjust and tune both in terms of electron density and ORP desired in the bioreactor. For example, ORP control around a set point can be achieved by feedback control through ORP probes and electron density adjustment. As another example, contaminant(s), co-contaminants, reactants, and/or products of interest effluent concentrations measured can be used in a feed back control loop to control both electron energy (voltage) and number of electrons (milli-amps) needed to both increase the performance of the EBR and or to lower the energy expenditure to perform the desired transformations.

Figure 16:
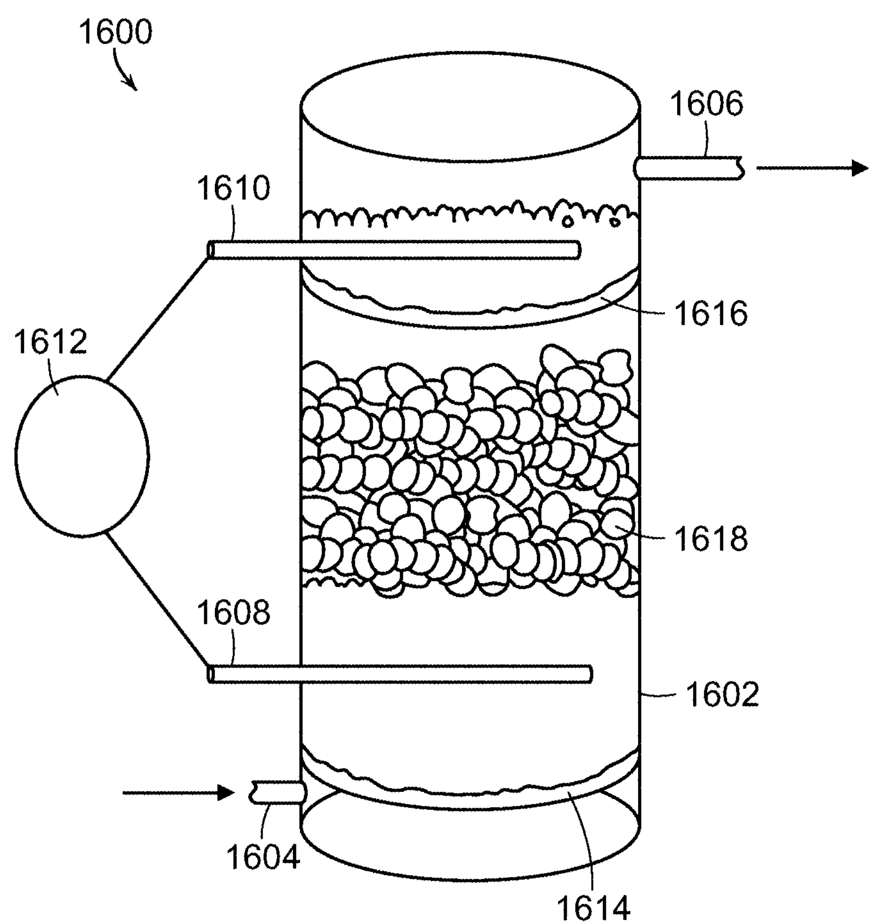
FIG. 16 is a diagrammatic view of an exemplary electrobiochemical reactor configuration embodying the present invention.

With reference now to FIG. 16, a non-limiting example of an electrobiochemical reactor 1600 is shown. This is in the form of a housing 1602 having a fluid inlet 1604 and a fluid outlet 1606. While the fluid pathway is shown flowing upwardly through the housing 1602, it will be appreciated that the liquid to be treated could also flow downwardly through the housing 1602 such that the inlet 1604 and outlet 1606 are reversed.

Electrodes 1608 and 1610, one forming an anode and another a cathode, are associated with the biochemical reactor 1600 so as to create a free electron field therein. As discussed above, the number of electrodes, placement and configuration, etc. can be varied to meet the needs of the electrochemical bioreactor purpose 1600. The electrodes 1608 and 1610 are operably coupled to a source of electricity 1612, which can provide a source of voltage and amperage. Preferably, as discussed above, the voltage and/or amperage is adjustable so that a predetermined voltage and amperage can be supplied to the EBR 1600, and such can be adjusted as deemed beneficial and necessary. The power source 1612 can vary, including an alternating current power source, a direct current power source, a direct power source operated in an on/off manner, a power source connected to a power grid, a portable generator, a battery, or even a telluric, wind or solar power. These are particularly useful when treating fluids and wastewater in remote locations. The electrodes 1608 and 1610 can extend into the bioreactor 1600, be placed outside of the housing 1602 of the bioreactor, or even be formed of portions of the housing 1602 so long as a free electron field is adequately created within the bioreactor 1600 where the microorganisms and/or enzymes are located and through which the fluid to be treated will pass. It is also contemplated that one or more of the electrodes could comprise an inductive electrode.

The bioreactor 1600 may be of a plug-type, wherein the fluid is to pass through plates 1614 and 1616 or other obstructions between the inlet 1604 and the outlet 1606. Such obstructions could comprise the support surfaces 1618, which may be activated and/or of a high surface area, which supports the microorganisms and/or enzymes thereon. As discussed above, a population of microorganisms and/or enzymes is developed on the support surfaces 1618 within the bioreactor 1600. The support surfaces 1618 and microorganisms and/or enzymes are within the free electron field generated by the electrodes 1608 and 1610, and also in the fluid pathway such that the fluid comes into contact with the microorganisms and/or enzymes on the support surfaces 1618, such that the contaminants thereof are transformed and/or could remain within the system matrix materials or be removed from the fluid as it passes through the electrochemical bioreactor 1600.

Figure 17:
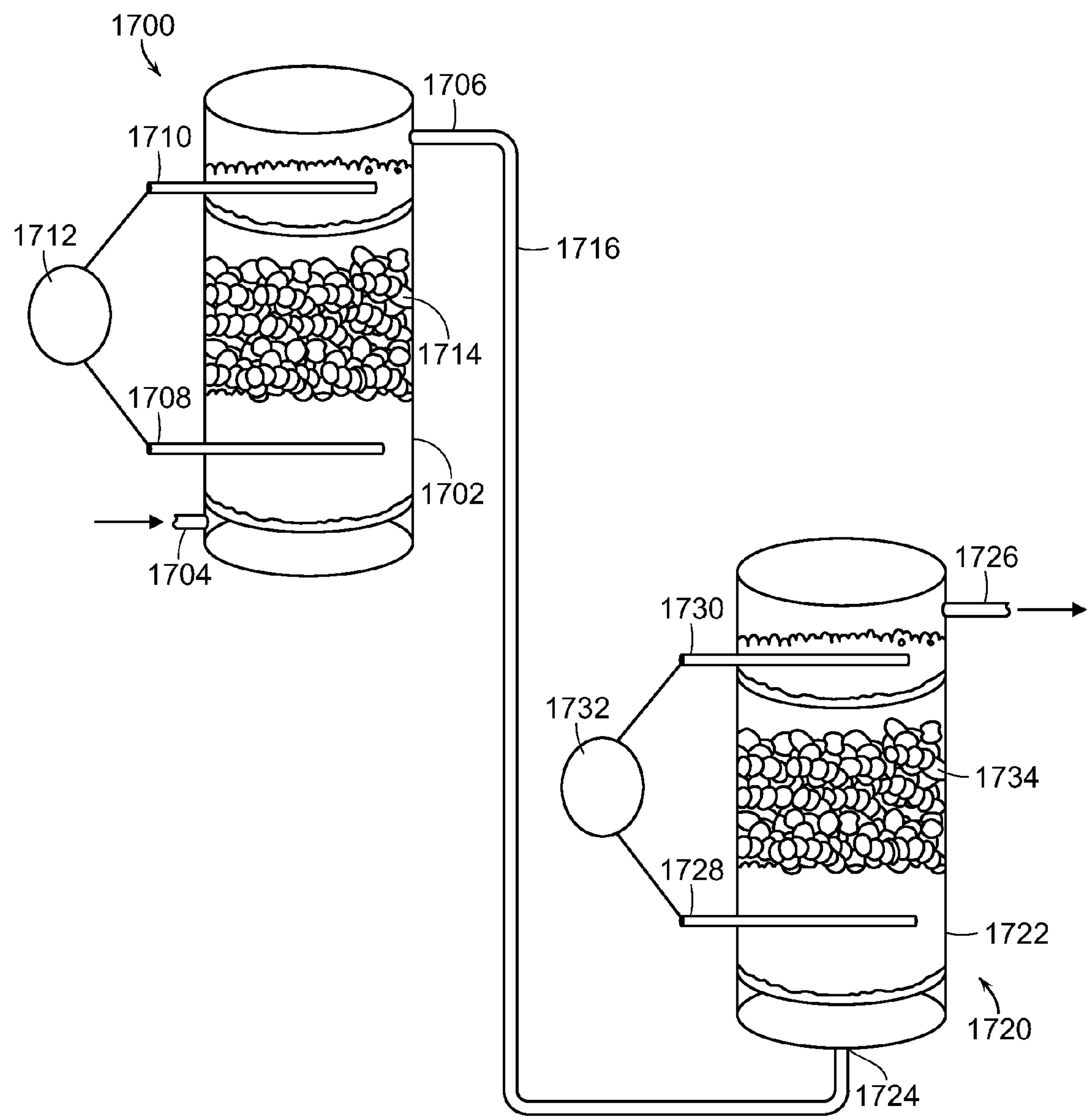
FIG. 17 is a diagrammatic view similar to FIG. 16, but illustrating the use of multiple electrobiochemical reactors, in accordance with the present invention.

With reference now to FIG. 17, a plurality of electrobiochemical reactors may be used instead, each in sequence with one another. FIG. 17 illustrates two electrochemical bioreactors 1700 and 1720 fluidly connected to one another. The electrochemical bioreactor 1700 and 1720 may be of the same or different configurations. The electrochemical bioreactor 1700 and 1720 may be designed so as to remove the same target contaminant compound, or each designed to remove different contaminant target compounds. For example, the number of electrodes and/or electrode placement configuration can vary between the two electrochemical bioreactors 1700 and 1720 so as to remove and/or transform different contaminant target compounds. Additionally, or alternatively, the microorganisms and/or enzymes within each electrochemical bioreactor 1700 and 1720 may be different so as to transform and/or remove a different contaminant target compound. This might require that a different electric potential in the form of a voltage and amperage, be different between the electrochemical bioreactor 1700 and 1720 as previously determined based upon the analysis of the water chemistry, microorganisms and/or enzymes used, and contaminant compounds to be targeted for removal and/or transformation, as discussed more fully above.

With reference again to FIG. 17, the first electrochemical bioreactor 1700 includes a housing 1702 having an inlet 1704 and a fluid outlet 1706. Two or more electrodes 1708 and 1710 are coupled to a source of electricity 1712 for generating the electron field. The microorganisms and/or enzymes are developed on support surfaces 1714 within the electrochemical bioreactor 1700, which is disposed within the electron field generated by the electrodes 1708 and 1710 and also within the path of the fluid passing through the electrochemical bioreactor 1700.

The first electrochemical bioreactor 1700 and second electrochemical bioreactor 1720 are fluidly connected, such as by tubing 1716. In the illustrated case of FIG. 17, the second electrochemical bioreactor 1720 is similar to the first electrochemical bioreactor 1700 in that it has a housing 1722 with a fluid inlet 1724 and a fluid outlet 1726. Electrodes 1728 and 1730 are coupled to a source of electricity 1732 for creating an electron field within the electrochemical bioreactor 1720, and more particularly over a population of microorganisms and/or enzymes which are typically disposed on a support surface 1734.

It should be noted that a variety of electrochemical bioreactor designs can be utilized, including a down-flow, horizontal flow, flow along a pathway, plug flow, semi-continuous, batch, fluidized bed, etc.

Figure 18:
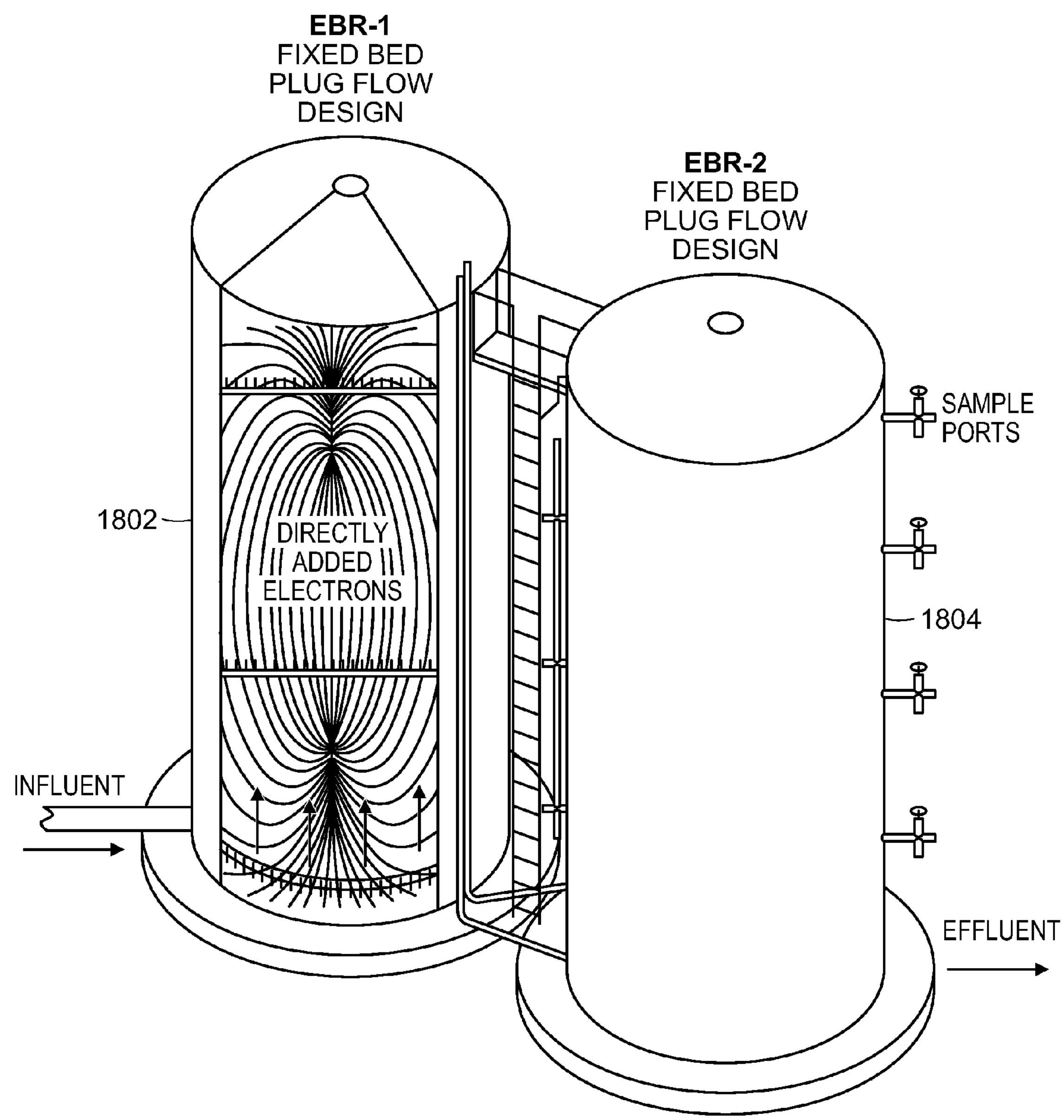
FIG. 18 is a diagrammatic view of a large scale electrobiochemical reactor and the free electron field generated therein, in accordance with the present invention.

It will also be appreciated that not only the number of electrochemical bioreactors can vary but also the scale and size of such electrochemical bioreactors. These EBR may be used in modular systems based on designs and design sizes for specific applications. For example, in FIG. 18, two electrochemical bioreactors 1802 and 1804 of a very large size are illustrated. These electrochemical bioreactors would be designed as described above so as to include a population of microorganisms and/or enzymes disposed within a free electron field and having contaminated fluid passing over and into contact with the microorganisms and/or enzymes such that one or more compounds targeted for removal from the fluid can be transformed and/or removed. The electrochemical bioreactors in FIG. 18 can be fluidly coupled to one another or receive a source of fluid separately.

Figure 19:
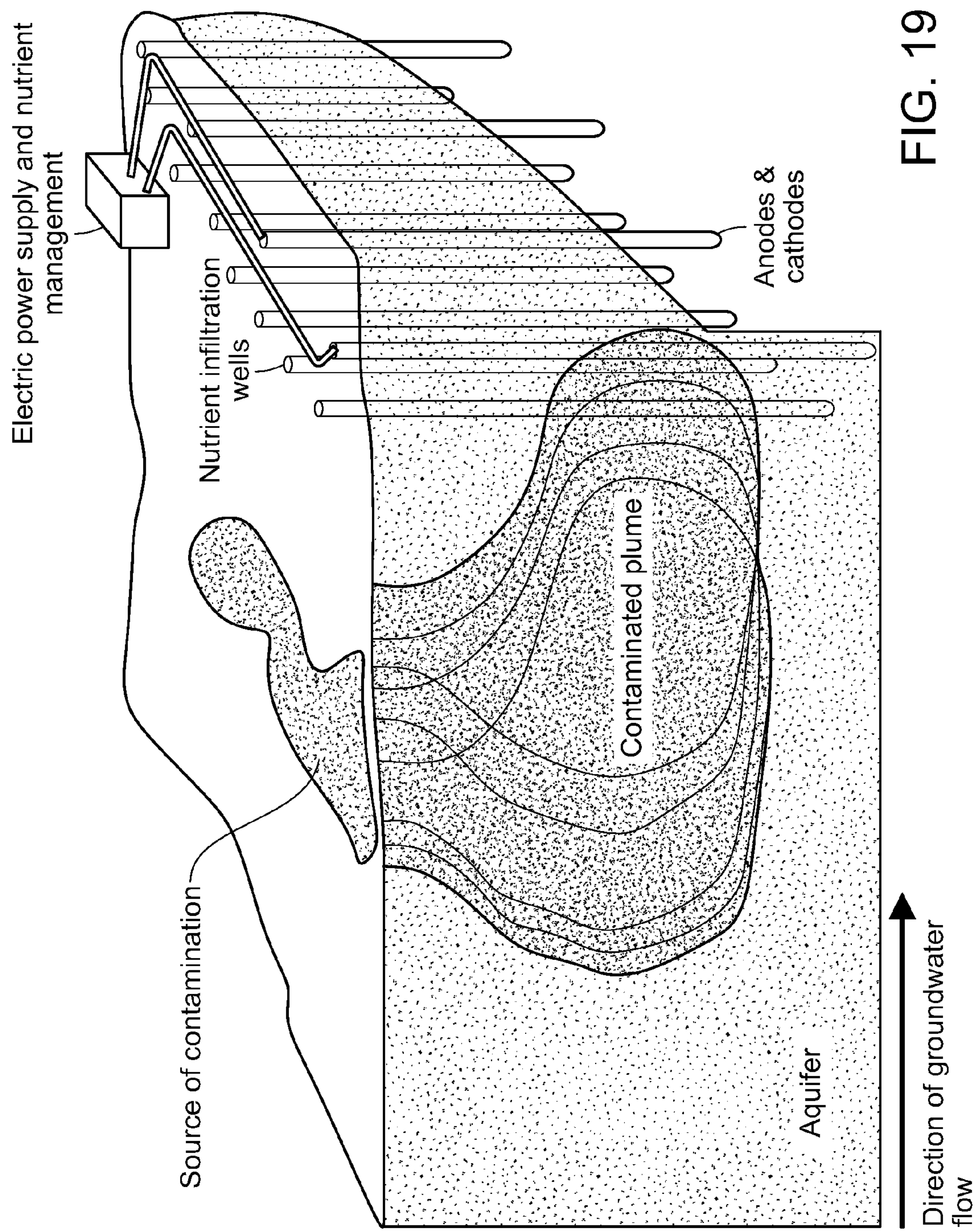
FIG. 19 is a diagrammatic view illustrating the invention performed in-situ.

With reference now to FIG. 19, the system can be part of a permeable reactive barrier, which treats underground wastewater along a plume, portions of a water table, or the like. This can be tested at bench sale, and then scaled upwardly so as to be installed in-situ. The electrodes (anodes and cathodes) would create an electric field through a permeable reactive barrier, such that as the contaminated plume portion of a water table or the like passed through the permeable reactive barrier, which serves as a support for the microorganisms and/or enzymes, the one or more contaminants within the water or contaminated liquid would be transformed and/or removed. Such an arrangement could also be incorporated into a runoff stream or the like.

It will be appreciated that depending upon the electrode placement and configuration, which can include rods, plates, etc., electrodes present within the fluid flow and in close proximity to the support surfaces may have a limited number of microorganisms and/or enzymes attached thereto. However, these numbers are insignificant as compared to the microbial biofilm on the active portions of the microbial support surfaces that receive the electrons provided by the electrodes. The support surfaces are where the high density of microorganisms and/or enzymes will be deposited and become populated. This is also where nearly all of the chemical transformations and/or target compound removal will occur.

While there are water treatment applications wherein voltage is utilized to reduce or eliminate microorganisms and/or directly transform or destroy contaminants, the present invention applies voltage and amperage in limited amounts to enhance the activity of the microorganism and/or enzyme population by directly providing energy in the form of electrons that do not require metabolic energy expenditure for removing target compounds, and as such, a voltage sufficient to cause damage to the microorganism population inherently lessens the efficacy of the system. In other words, the microbial population can only effectively utilize electrons in limited amounts and energy levels and this is determined by a number of variations in water chemistry, reactor configuration and size, microorganisms utilized, etc., as described above. Variations in the size of the reactor, the particular microorganisms utilized, and other parameters of reactor design can affect the amount of voltage that is optimal.

Figure 20:
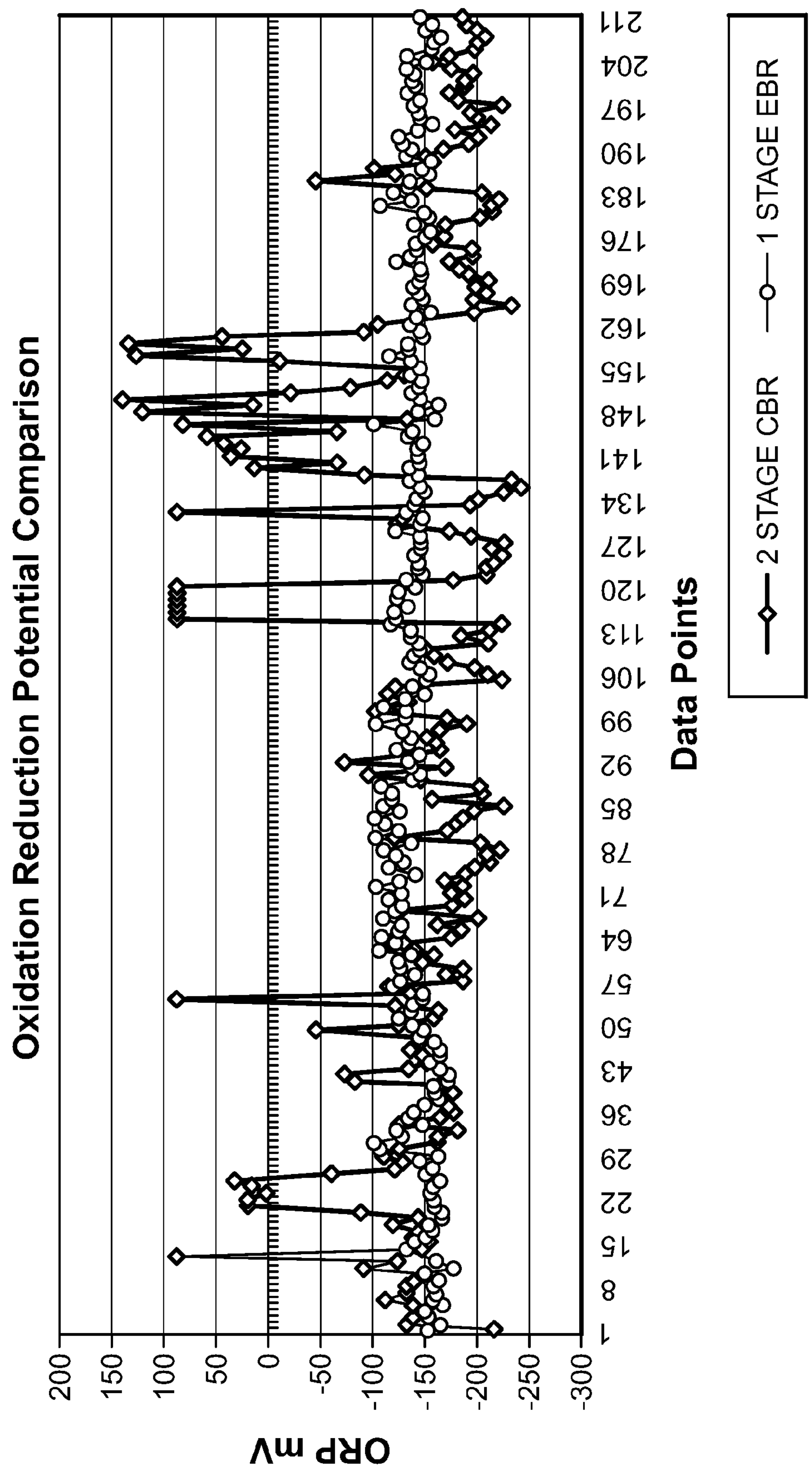
FIG. 20 is a graph depicting the difference between the ORP, with changing water chemistry, in the second stage of a conventional bioreactor and the first stage of an electrobiochemical reactor embodying the present invention.

With reference now to FIG. 20, this figure illustrates the difference between the ORP in a conventional bioreactor (CBR) in the second stage, which is more stable than in the first stage, and the very stable ORP in the electrobiochemical reactor (EBR) of the present invention. The control and adjustability of the ORP in the EBR of the present invention is very evident. This leads to more stable and controllable ORP performance, better contaminant and co-contaminant, reactant and/or product of interest transformation rates and to lower levels, increased bioreactor robustness, and much lower bioreactor biomass production.

Figure 21:
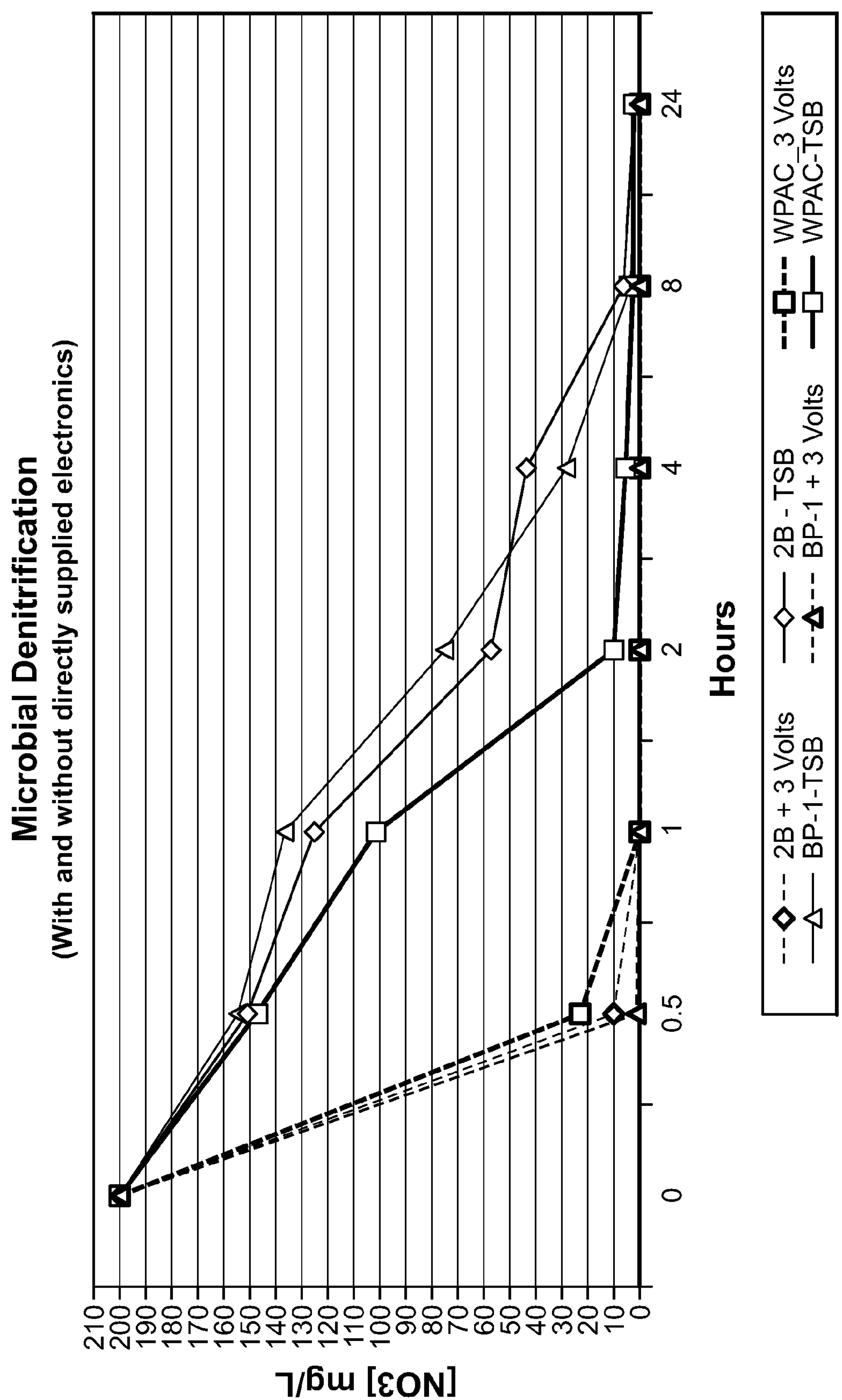
FIG. 21 is a graph depicting microbial denitrification, with and without directly supplied electrons.

With reference now to FIGS. 21 and 22, examples are provided of the performance enhancement of the present invention in a difficult to treat mining water. In FIG. 21, denitrification in optimum Eh(V) ORP range wastewater is shown. This shows the difference in total nitrate-N reduction in a conventional bioreactor (CBR) and an electrobiochemical reactor (EBR) embodying the present invention. These figures show the increased denitrification kinetics with the EBR at an applied potential of three volts at a high ORP wastewater. The amperage during this test was very low (0.01 amps) but provided a very significant improvement in reduction of both nitrate and nitrite, removals to below detection in less than one hour as compared to approximately eight hours or more for the CBR not having free electrons supplied to the microbes, but instead utilizing materials, such as nutrients, within the reactor and/or wastewater.

Figure 22A:
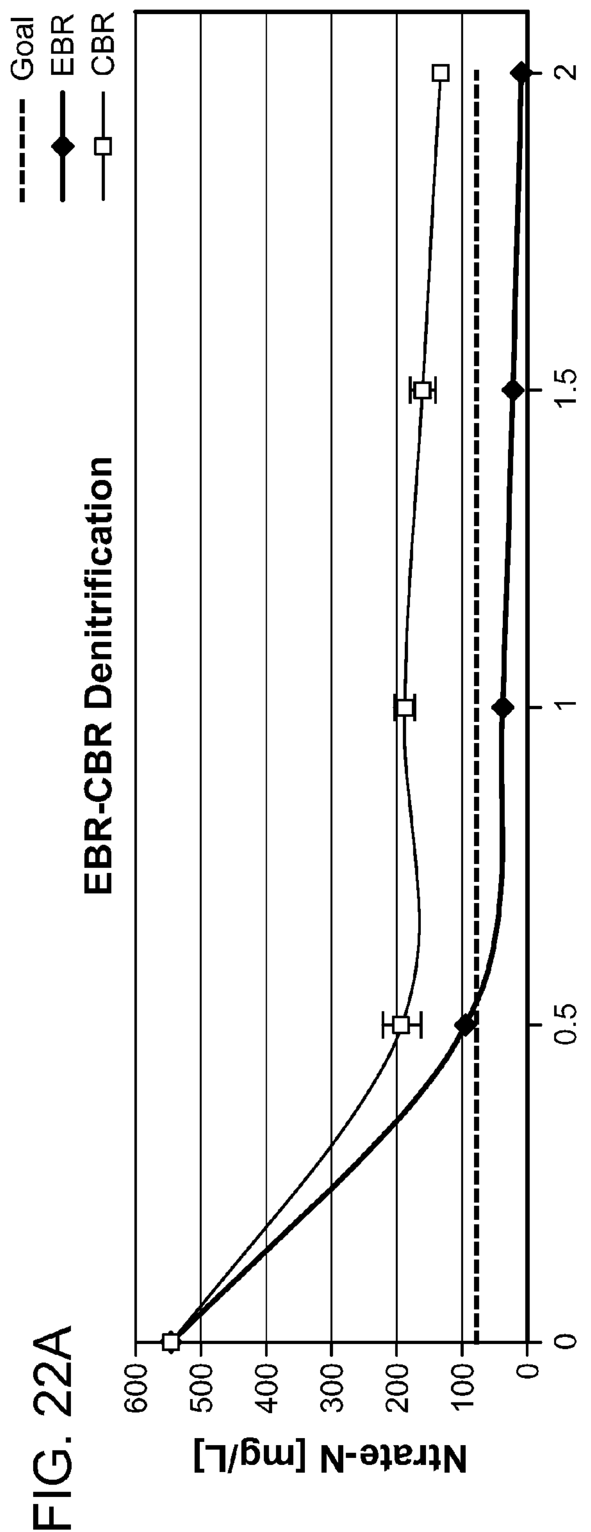
FIG. 22A is a graph depicting denitrification comparison between a conventional bioreactor and an electrobiochemical reactor of the present invention.
Figure 22B:
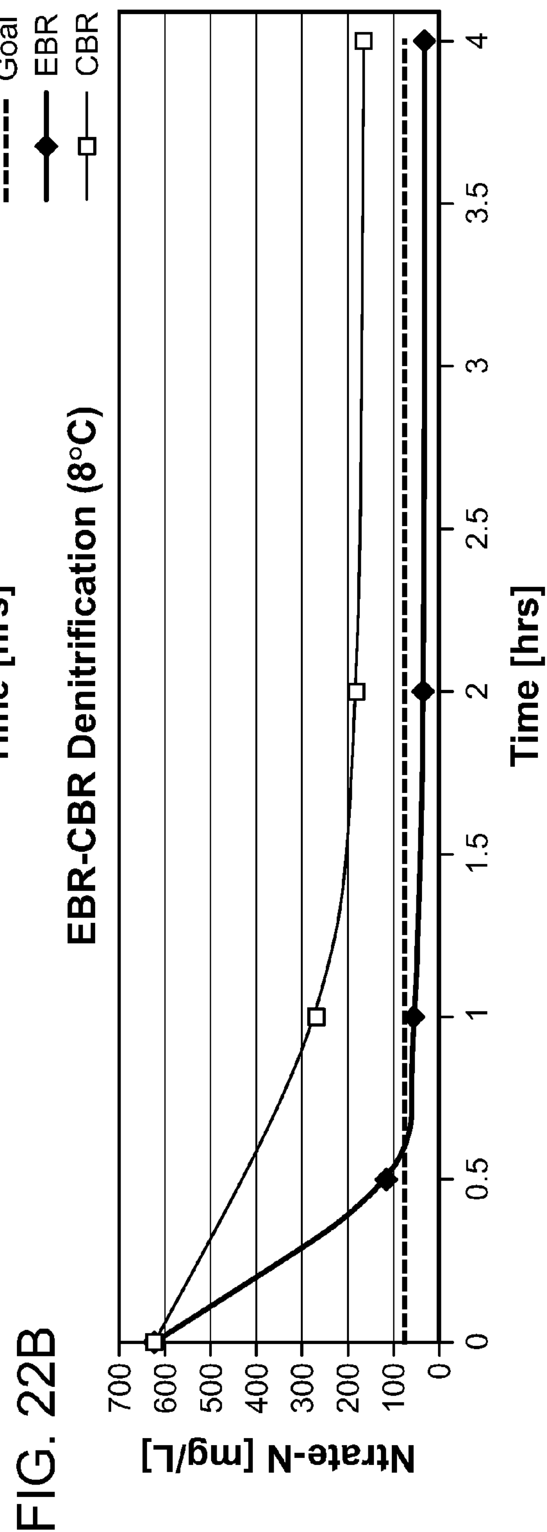
FIG. 22B is a graph similar to FIG. 22A, but at a lower temperature.

FIGS. 22A and 22B are bioreactor systems that were both inoculated with the same microbes at the same population density and operated in an identical manner using the same mine wastewater. However, one bioreactor was a conventional bioreactor and the other was an EBR embodying the present invention and having three volts potential applied thereto using 0.03 amps of amperage. In FIG. 22B, the test was performed at a lower temperature at which conventional bioreactors do not perform as efficiently. However, in each case, it can be seen that the EBR of the present invention significantly outperformed the conventional bioreactor due to the provision of directly supplied electrons in an electron field to which the microorganisms and/or enzymes were exposed.

Figure 23:
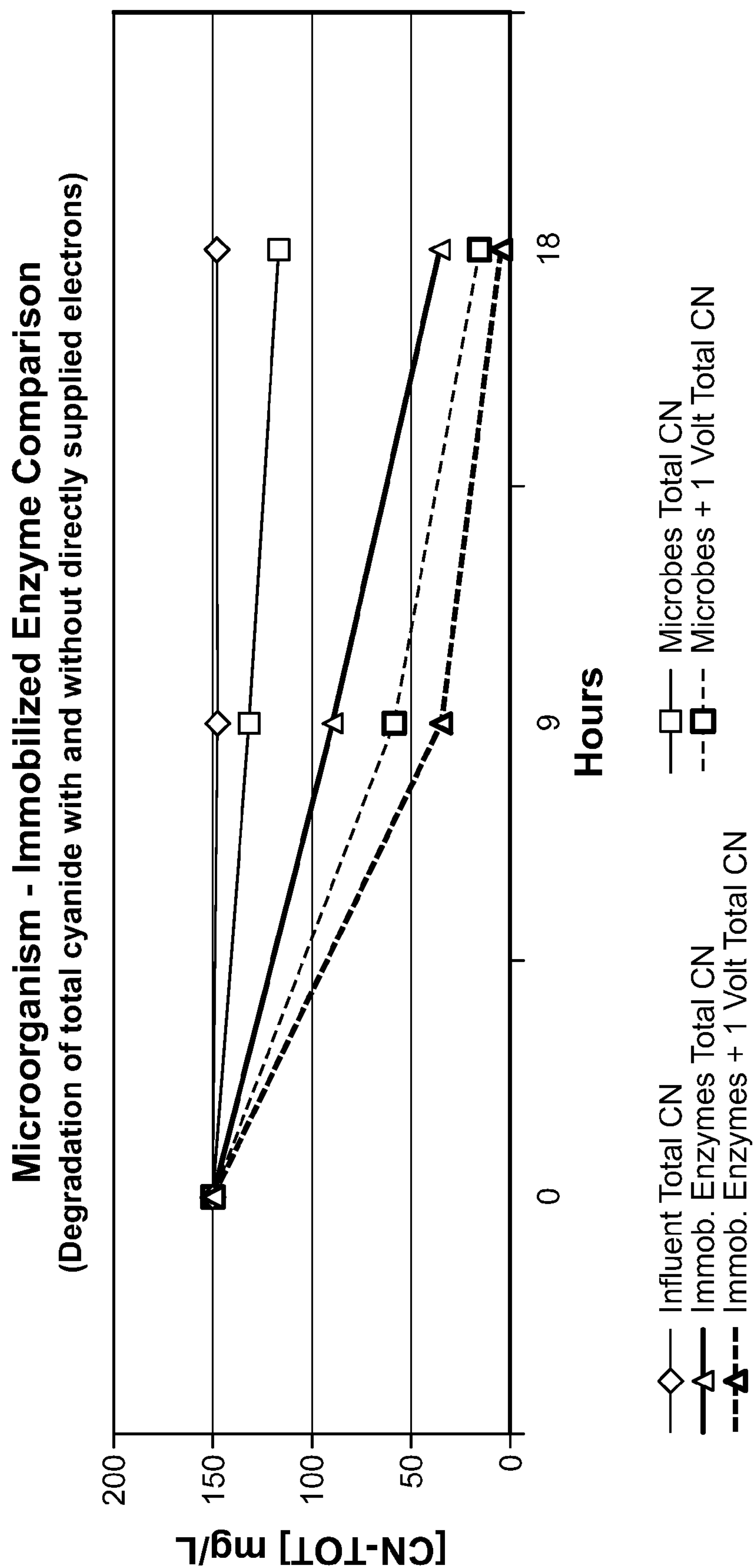
FIG. 23 is a graph depicting the effects of applied potential on both live microbes and enzyme preparations for cyanide removal.

With reference now to FIG. 23, the effects of applied potential to both live microbes and enzyme preparations for total cyanide removal, is shown. The applied potential increases the kinetics of cyanide removal significantly over conventional systems that use no applied potential.

Figure 24:
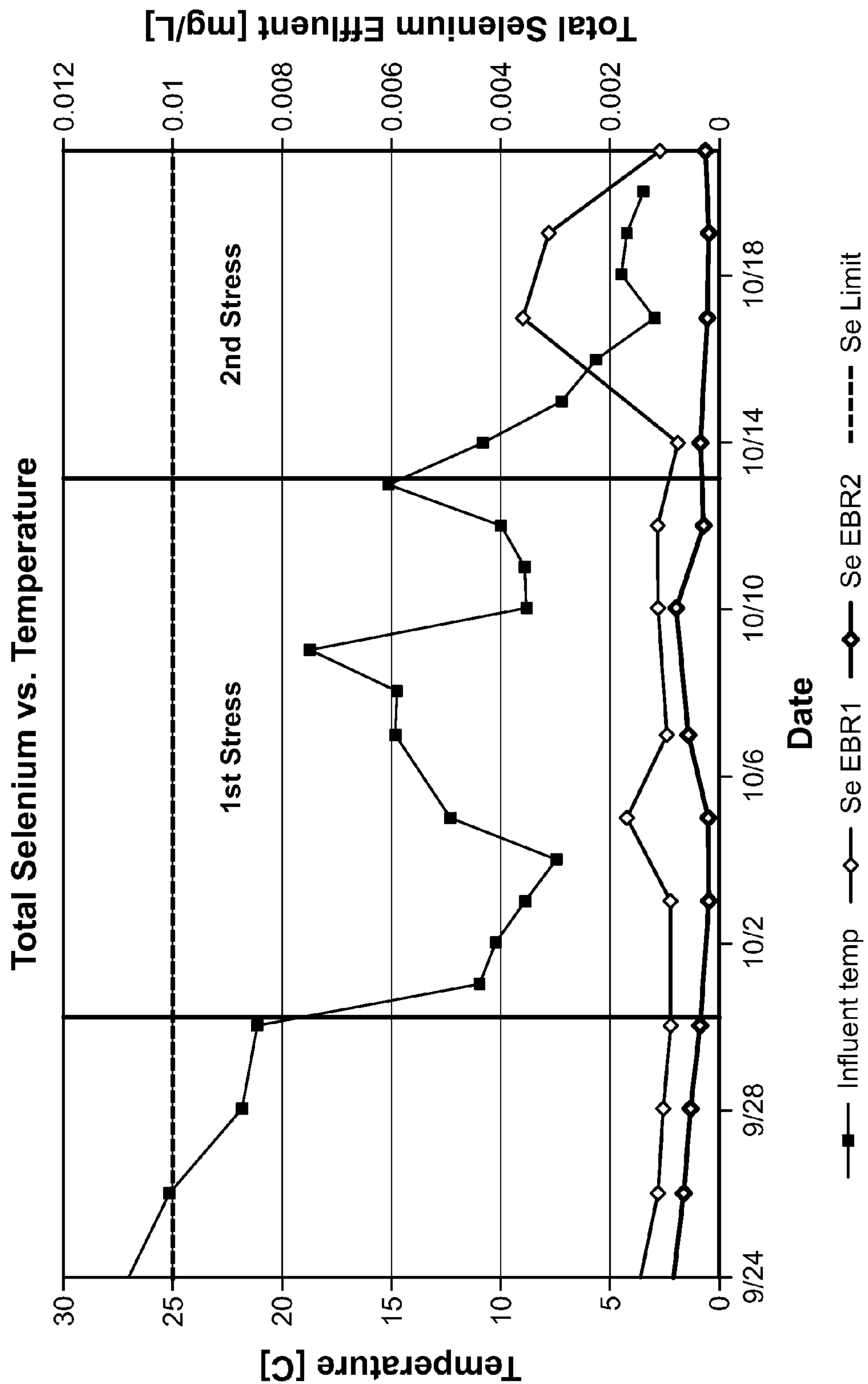
FIG. 24 is a graph depicting the benefit of directly supplied electrons in reducing the effects of low temperature in a electrobiochemical system designed for selenium removal in accordance with the present invention.

With reference now to FIG. 24, the benefit of directly supplied electrons in reducing the effects of low temperature in an EBR system designed for selenium (SE) removal is shown. As the EBR of the present invention provides "free" electrons, it functions well at low temperatures where low temperatures cause metabolism to slow down, thus slowing down contaminant removal or not removing the contaminant effectively otherwise.

Figure 25:
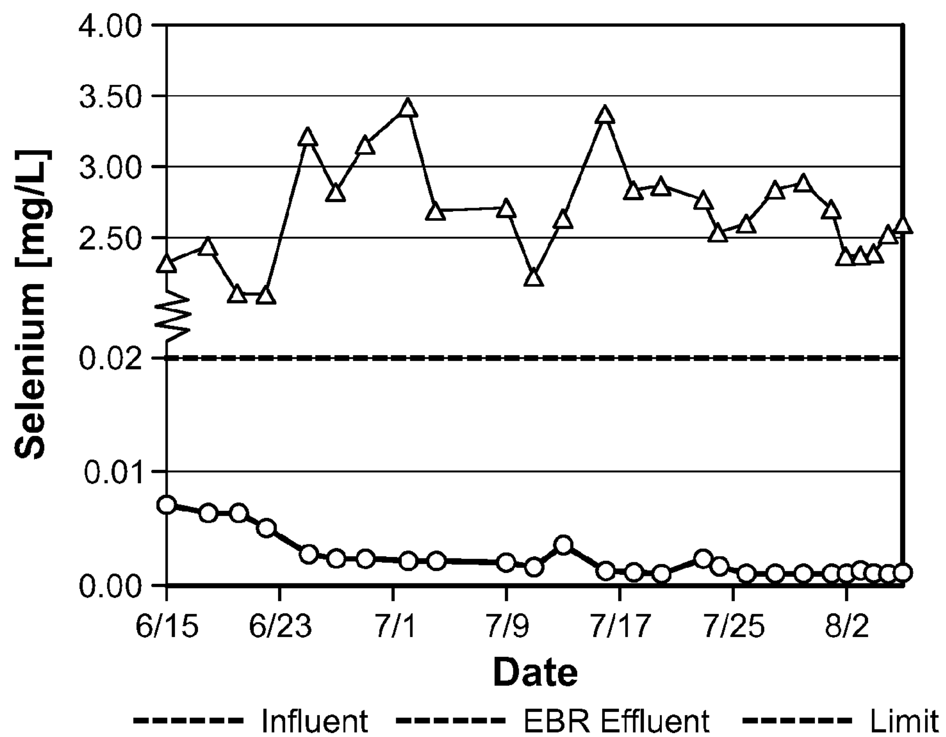
FIG. 25 is a graph and corresponding table illustrating selenium transformation/removal, as well as transformation or removal of other contaminants present in the same wastewater within the targeted Eh(V) range used.

With reference now to FIG. 25, although an EBR may be focused primarily on the removal of a single target contaminant compound, in this case Se, however, the EBR system will also transform or remove other contaminants present in the same wastewater within the targeted Eh(V) range.

Figure 26:
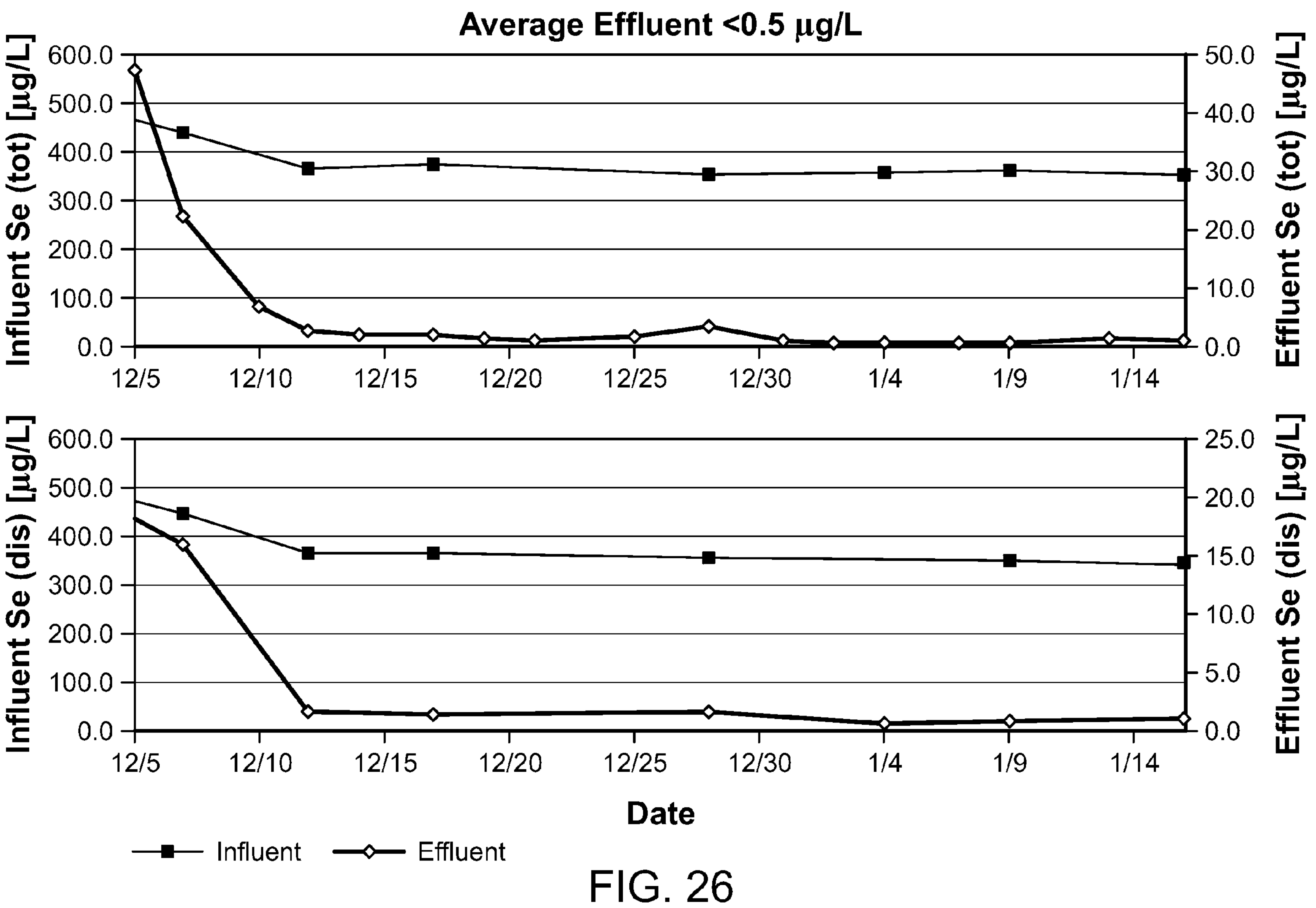
FIG. 26 are graphs showing that the electrobiochemical reactor system of the present invention effectively removes both total and dissolved selenium forms.

With reference now to FIG. 26, these diagrams illustrate that the plug flow EBR of the present invention is effectively removing both total and dissolved selenium forms. Suspended or mixed reactors do not effectively capture the total selenium as a significant amount can escape as very small particulates, unless additional equipment, such as filtration systems are used to capture these particulates.

The target compound or compounds which have been transformed may be recovered or off-gassed from the fluid, as in denitrification which yields nitrogen gas. The method of the present invention could be utilized to remove one or a plurality of target compounds from a wastewater or other fluid source.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function, and manner of operation, assembly, and use may be made without departing from the principles and concepts set forth herein.

What is claimed is:

1. A method for transforming a target compound within a liquid, comprising:

analyzing the liquid to determine liquid chemistry, including the target compound to be transformed and/or removed from the liquid;

determining chemical reactions required to transform and/or remove the target compound from the liquid;

identifying microorganisms and/or enzymes that will facilitate the transformation of the target compound and/or remove the target compound from the liquid;

conditioning the microorganisms and/or enzymes so as to increase utilization of free electrons, instead of requiring metabolism of nutrients and/or electron donors or electron shuttles, to obtain the energy and/or electrons to effectuate a transformation of the target compound;

arranging a plurality of spaced apart electrodes so as to create a free electron field in a treatment area, the electrodes being stable and non-reactive as to the transformation or removal of the target compound;

placing high surface area support surfaces within the treatment area and the flow of the liquid;

developing a population of the identified and conditioned microorganisms and/or enzymes on the support surfaces within the treatment area and spaced from the electrodes;

selecting a voltage and an amperage within a range based on the determined chemical reactions to assist the microorganisms and/or enzymes to perform the removal or transformation of the target compound and being insufficient to reduce or damage the population of microorganisms and/or enzymes, wherein the applied voltage is approximately 5 volts or less and the applied amperage is approximately 2,500 milliamps or less; and applying the selected voltage and amperage to the electrodes to create the free electron field between the electrodes to directly supply electrons to the microorganisms and/or enzymes, so that the electrons are freely available to the microorganisms and/or enzymes to transform the target compound without the need to obtain electrons from metabolism of nutrients and/or electron donors or electron shuttles.

2. The method of claim 1, wherein the identifying step includes the step of identifying microorganisms and/or enzymes that are compatible with one another and/or microbes within the liquid.

3. The method of claim 1, wherein the step of conditioning the microorganisms and/or enzymes comprises the step of placing the microorganisms and/or enzymes in an environment with directly supplied, freely available electrons in order that the microorganisms and/or enzymes are more able to effectively utilize the directly supplied electrons to transform and/or remove the target compound from the liquid without nutrient metabolism or use of electron donors or shuttles.

4. The method of claim 1, including the step of identifying, conditioning and developing multiple types of microorganisms and genetic complements and/or enzymes that will facilitate the transformation and/or removal of the target compound from the liquid.

5. The method of claim 1, wherein the developing a population step includes the step of establishing a high density of microorganisms and/or enzymes in the treatment area.

6. The method of claim 1, wherein the determining chemical reactions step comprises the step of determining oxidation/reduction half reactions required to transform the target compound.

7. The method of claim 1, wherein the selecting step includes the step of calculating the voltage and amperage needed by the microorganisms and/or enzymes to transform the target compound based on determined oxidation/reduction half reactions required to transform the target compound.

8. The method of claim 1, including the step of adjusting the voltage and/or amperage to optimize the microorganism and/or enzyme target compound transformations based on determined chemical reactions and number of electrons required at a determined liquid pH.

9. The method of claim 1, wherein the number and arrangement of electrodes is determined by the analysis of the liquid chemistry, including Eh(V) (oxidation-reduction potential), pH, and/or half reactions and interactions in order to adjust the number of directly supplied electrons available per second to the microorganisms and/or enzymes.

10. The method of claim 1, wherein the applied amperage is between 0.01 to 70 milliamps.

11. The method of claim 1, wherein the applied amperage is between 70 and 2,500 milliamps.

12. The method of claim 1, including the step of activating the support surfaces to increase the microorganism and/or enzyme support capacity of the support surfaces.

13. The method of claim 12, wherein the support surface comprises an activated carbon material.

14. The method of claim 1, including the step of providing a first enclosed bioreactor having electrodes associated therewith for creating a supply of freely available electrons within an electron field therein and microorganism and/or enzyme support surfaces disposed therein between a liquid inlet and a liquid outlet of the bioreactor.

15. The method of claim 1, including the step of testing treated liquid to determine that target compound transformation and/or removal is occurring at a predetermined rate and/or amount.

16. The method of claim 15, including the step of adjusting the voltage and/or the amperage applied to the electrodes to alter the density and/or energy of the free electrons within the electron field such that target compound transformation and/or removal by the microorganisms and/or enzymes occurs at an improved rate and/or efficiency.

17. The method of claim 1, including the steps of determining multiple target compounds to be transformed and/or removed from the liquid, and identifying and developing multiple types of microorganisms and/or enzymes that will facilitate the transformation and/or removal of the target compounds from the liquid.

18. The method of claim 1, wherein the target compound is recovered from the liquid.

19. The method of claim 18, wherein the liquid is water and the target compound comprises a metal or inorganic compound.

20. The method of claim 19, wherein the target compound comprises selenium, arsenic, mercury, a nitrate or a sulfate.

21. The method of claim 1, including the step of transforming and/or removing the target compound in-situ.

22. The method of claim 1, wherein the step of developing a population of microorganisms and/or enzymes is prior to or concurrent with the step of creating a free electron field.

23. The method of claim 14, including the step of providing a second bioreactor in fluid communication with the first bioreactor, the second bioreactor having support surfaces therein supporting microorganisms and/or enzymes for removing or transforming a target compound from the liquid, and electrodes associated therewith for creating a free electron field within the second bioreactor.

24. The method of claim 23, wherein the electrode placement and/or microorganisms and/or enzymes in the second bioreactor are different than the microorganisms and/or enzymes of the first bioreactor for removing or transforming a second target compound from the liquid.

25. A method for transforming a target compound within a liquid, comprising:

analyzing the liquid to determine liquid chemistry, including the target compound to be transformed and/or removed from the liquid;

determining chemical reactions required to transform and/or remove the target compound from the liquid, including determining oxidation/reduction half reactions required to transform the target compound;

identifying microorganisms and/or enzymes that will facilitate the transformation of the target compound and/or remove the target compound from the liquid;

conditioning the identified microorganisms and/or enzymes in an environment with directly supplied, freely available electrons in order that the microorganisms and/or enzymes more effectively utilize the directly supplied electrons to transform and/or remove the target compound from the liquid;

arranging a plurality of spaced apart electrodes so as to create a free electron field in a treatment area, the electrodes being stable and non-reactive as to the transformation or removal of the target compound, wherein the number and arrangement of electrodes is determined by the analysis of the liquid chemistry, including Eh(V) (oxidation-reduction potential voltage), pH, and/or half reactions and interactions in order to adjust the number of directly supplied electrons available per second to the microorganisms and/or enzymes;

placing high surface area support surfaces, separate from the electrodes, within the flow of the liquid in the treatment area;

developing a high density population of the identified and conditioned microorganisms and/or enzymes on the support surfaces;

calculating a voltage and an amperage range, based on the determined oxidation/reduction half reactions, that is needed by the microorganisms and/or enzymes to perform the removal or transformation of the target compound while being insufficient to reduce or damage the population of microorganisms and/or enzymes, wherein the applied voltage is approximately 5 volts or less and the applied amperage is approximately 2,500 milliamps or less;

applying the selected voltage and amperage to the electrodes to create the free electron field between the electrodes to directly supply electrons to the microorganisms and/or enzymes, so that the electrons are freely available to the microorganisms and/or enzymes to transform the target compound without the need to obtain electrons from metabolism of nutrients and/or electron donors or electron shuttles; and testing treated liquid to determine that target compound transformation and/or removal is occurring at a predetermined rate and/or amount.

26. The method of claim 25, wherein the identifying step includes the step of identifying microorganisms and/or enzymes that are compatible with one another and/or microbes within the liquid.

27. The method of claim 25, including the step of identifying, conditioning and developing multiple types of microorganisms and genetic complements and/or enzymes that will facilitate the transformation and/or removal of the target compound from the liquid.

28. The method of claim 25, including the step of activating the support surfaces to increase the microorganism and/or enzyme support capacity of the support surfaces.

29. The method of claim 25, including the step of providing a first enclosed bioreactor having electrodes associated therewith for creating a supply of freely available electrons within an electron field therein and microorganism and/or enzyme support surfaces disposed therein between a liquid inlet and a liquid outlet of the bioreactor.

30. The method of claim 25, including the step of adjusting the voltage and/or the amperage applied to the electrodes to alter the density and/or energy of the free electrons within the electron field such that target compound transformation and/or removal by the microorganisms and/or enzymes occurs at an improved rate and/or efficiency.

31. The method of claim 25, including the steps of determining multiple target compounds to be transformed and/or removed from the liquid, and identifying and developing multiple types of microorganisms and/or enzymes that will facilitate the transformation and/or removal of the target compounds from the liquid.

32. The method of claim 25, wherein the target compound is recovered from the liquid.

33. The method of claim 32, wherein the liquid is water and the target compound comprises a metal or inorganic compound.

34. The method of claim 33, wherein the target compound comprises selenium, arsenic, mercury, a nitrate or a sulfate.

35. The method of claim 25, including the step of transforming and/or removing the target compound in-situ.

36. The method of claim 25, wherein the step of developing a population of microorganisms and/or enzymes is prior to or concurrent with the step of creating a free electron field.

37. The method of claim 29, including the step of providing a second bioreactor in fluid communication with the first bioreactor, the second bioreactor having support surfaces therein supporting microorganisms and/or enzymes for removing or transforming a target compound from the liquid, and electrodes associated therewith for creating a free electron field within the second bioreactor.

38. The method of claim 37, wherein the electrode placement and/or microorganisms and/or enzymes in the second bioreactor are different than the microorganisms and/or enzymes of the first bioreactor for removing or transforming a second target compound from the liquid.

* * * * *